US008229356B2

(12) United States Patent
Kawamura

(10) Patent No.: US 8,229,356 B2
(45) Date of Patent: Jul. 24, 2012

(54) WIRELESS PROCESSING SYSTEM, WIRELESS PROCESSING METHOD, AND WIRELESS ELECTRONIC DEVICE

(75) Inventor: Hirofumi Kawamura, Chiba (JP)

(73) Assignee: Sony Corporation, Tokyo (JP)

( * ) Notice: Subject to any disclaimer, the term of this patent is extended or adjusted under 35 U.S.C. 154(b) by 686 days.

(21) Appl. No.: 12/514,943

(22) PCT Filed: Dec. 11, 2007

(86) PCT No.: PCT/JP2007/073867
§ 371 (c)(1),
(2), (4) Date: May 14, 2009

(87) PCT Pub. No.: WO2008/072628
PCT Pub. Date: Jun. 19, 2008

(65) Prior Publication Data
US 2010/0081378 A1    Apr. 1, 2010

(30) Foreign Application Priority Data

Dec. 12, 2006 (JP) .................................. 2006-334921

(51) Int. Cl.
H04B 5/00 (2006.01)
(52) U.S. Cl. ...................................................... 455/41.1
(58) Field of Classification Search .................. None
See application file for complete search history.

(56) References Cited

U.S. PATENT DOCUMENTS

| | | | | |
|---|---|---|---|---|
| 7,075,455 | B2 * | 7/2006 | Nishimura et al. | 340/870.28 |
| 7,728,551 | B2 * | 6/2010 | Reed et al. | 320/108 |
| 8,060,011 | B2 * | 11/2011 | Jin | 455/41.1 |
| 2008/0292131 | A1 * | 11/2008 | Takemoto et al. | 382/100 |

FOREIGN PATENT DOCUMENTS

| | | |
|---|---|---|
| JP | 11-122146 | 4/1999 |
| JP | 2001-340663 | 12/2001 |
| JP | 2002-060909 | 2/2002 |
| JP | 2002-197419 | 7/2002 |
| JP | 2004-262091 | 9/2004 |
| JP | 2004-350465 | 9/2004 |
| JP | 2006-060909 | 3/2006 |
| JP | 2006-094699 | 4/2006 |
| JP | 2006-201959 | 8/2006 |
| JP | 2006-246633 | 9/2006 |

* cited by examiner

Primary Examiner — Lincoln Donovan
Assistant Examiner — Khareem E Almo
(74) Attorney, Agent, or Firm — Robert J. Depke; Rockey, Depke & Lyons, LLC

(57) ABSTRACT

A power supply system 100 according to the present invention includes, as shown in FIG. 2, a power supply device 1 that includes an antenna coil 113 having a predetermined directivity and an display function unit 12 on a device mounting surface and performs wireless communication processing and a portable telephone 2a that includes an antenna coil 211 having a predetermined directivity, has terminal information used for achieving matching between antennas and used for achieving matching for the antenna coil 211 with respect to the antenna coil 113, and performs wireless communication processing. The power supply device 1 receives the terminal information from the portable telephone 2a and displays an outer-shape image Pa of the portable telephone 2a on the display function unit 12 in accordance with this terminal information. Matching can be optimally achieved between wireless processing points of two wireless electronic devices. Moreover, a predetermined power can be supplied from one wireless electronic device to another wireless electronic device or desired communication processing can be executed between two wireless electronic devices.

18 Claims, 21 Drawing Sheets

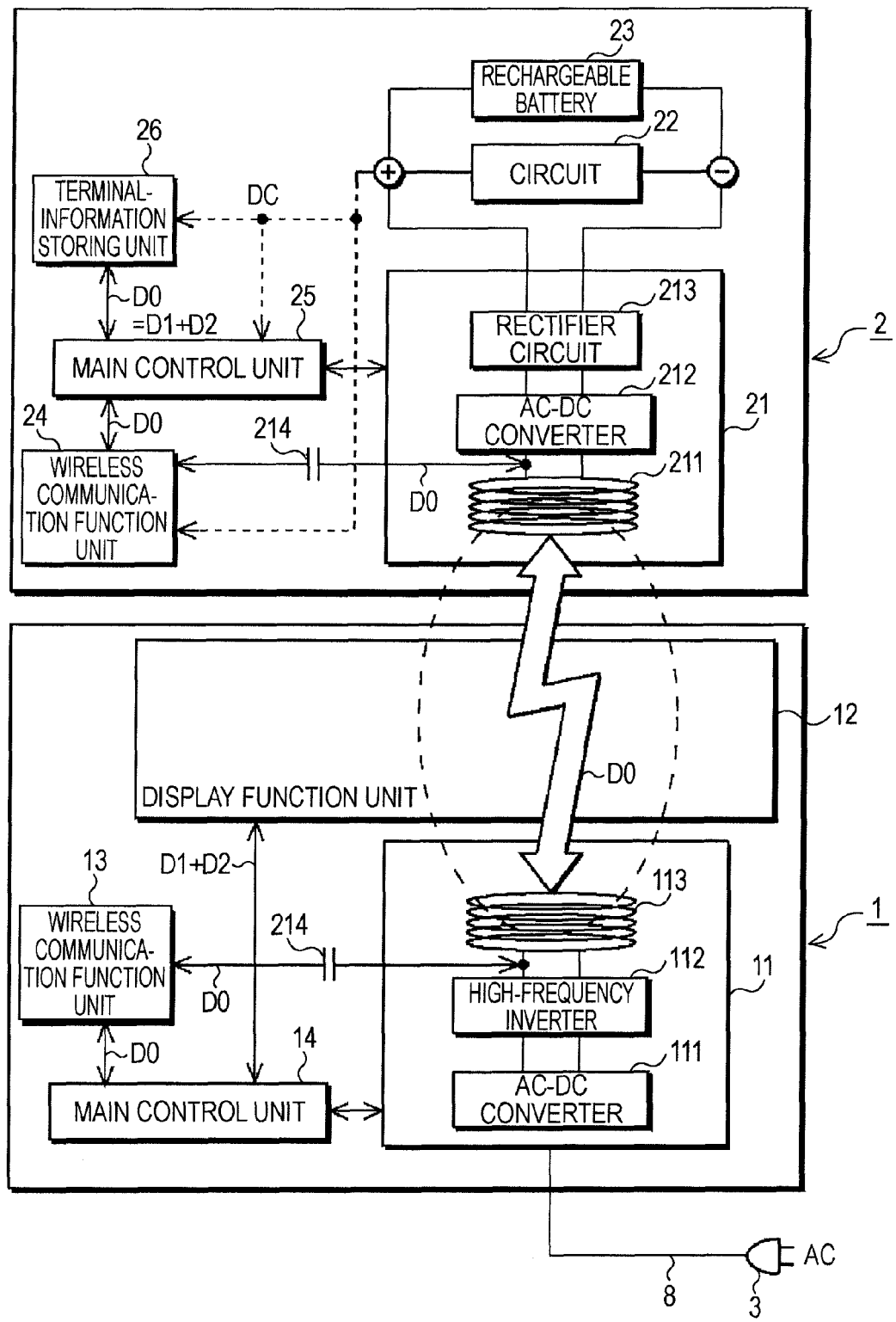

WIRELESS PROCESSING SYSTEM, WIRELESS PROCESSING METHOD, AND WIRELESS ELECTRONIC DEVICE

This application is a 371 U.S. National Stage filing of PCT/JP2007/073867, filed on Dec. 11, 2007, which claims priority to Japanese Patent Application Number 2006-334921 filed at the Japanese Patent Office on Dec. 12, 2006, all of which are incorporated herein by reference.

TECHNICAL FIELD

The present invention relates to a wireless processing system, a wireless processing method, and a wireless electronic device that are preferably applied to a noncontact power supply system that performs charging at a desired power, and a noncontact data communication system, a portable terminal device, and the like that perform communication processing using image and audio information.

More particularly, a first wireless electronic device that has an antenna having a predetermined directivity and a display unit provided on a device mounting surface and performs wireless communication processing is included, the first wireless electronic device receives, from a device to be mounted (a second wireless electronic device), outer-shape information for displaying a relationship between an outer-shape image and the antenna directivity of the second wireless electronic device in a position coordinate system used when matching is to be achieved for the first wireless electronic device and displays the outer-shape image of the second wireless electronic device on the display unit in accordance with this outer-shape information, and the second wireless electronic device is mounted so as to be aligned with the outer-shape image displayed on the display unit.

In this case, independently of the antenna directivity of the first wireless electronic device and the antenna directivity of the second wireless electronic device being aligned via visual checking of antenna appearances, matching is automatically achieved between the two antennas in a self-matching manner. Moreover, predetermined power is supplied from the first wireless electronic device to the second wireless electronic device and/or predetermined communication processing is executed between the first wireless electronic device and the second wireless electronic device in a state in which matching has been optimally achieved between the two antennas.

BACKGROUND ART

In recent years, portable telephones, PDAs (Personal Digital Assistants), portable audio devices, and rechargeable terminal devices such as electronic toothbrushes and electronic shavers (portable electronic devices, electrical devices, and the like) have been being used more often. Within these terminal devices, a rechargeable secondary battery is installed. When a terminal voltage of the rechargeable secondary battery becomes lower than a desired value, the secondary battery should be charged. Contact and noncontact secondary-battery charging methods are employed.

In a contact charging method referred to in Japanese Registered Utility Model No. 3125341 (page 3, FIG. 1), charging is performed in a state in which a terminal for receiving power supply provided on the above-described terminal device is in contact with or a dedicated plug is mounted on a terminal for performing charging provided on a charger. In a noncontact charging method referred to in Japanese Unexamined Patent Application Publication No. 2006-203997 (page 6, FIG. 4), for example, feeding or charging is performed from a power supply device to a terminal device by means of an induced electromotive force resulting from electromagnetic induction. The power supply device is a charger compatible with these terminal devices. According to the latter charging system, there is an advantage in that feeding and charging can be performed through a simple user operation such as putting or mounting of a device body onto a charger without a power cable being connected to a terminal device. Moreover, there is an advantage in that no connector for a power supply is necessary and thus superior waterproof property and safety are obtained.

FIG. 1 is a diagram showing an exemplary internal structure of a noncontact charging system 800 according to an existing example. According to the charging system 800 shown in FIG. 1, the charging system 800 includes a power supply device 10 and a terminal device 20. The power supply device 10 includes a power transmission function unit 11. The power transmission function unit 11 includes a power cord 8 connected to an AC plug 3. An AC-DC converter 111 is connected to the power cord 8, and operates in such a manner that, for example, alternating-current power of 100 V and 50 or 60 Hz is converted into direct-current power. A high-frequency inverter 112 is connected to the AC-DC converter 111, and operates in such a manner that alternating-current power of a high frequency of about 100 kHz is generated from direct-current power. A primary coil 113 is connected to the high-frequency inverter 112, and a voltage (power) of a high frequency of about 100 kHz is applied.

On the other hand, the terminal device 20 includes a power receiving function unit 21, a circuit 22, and a rechargeable battery 23. The power receiving function unit 21 includes a secondary coil 211, an AC-DC converter 212, and a rectifier circuit 213. An alternating magnetic field of a high frequency of about 100 kHz generated by the primary coil 113 passes through the secondary coil 211. The AC-DC converter 212 is connected to the secondary coil 211, and converts alternating-current power of a high frequency induced in the secondary coil 211 into direct-current power. The rectifier circuit 213 is connected to the AC-DC converter 212 and rectifies the direct-current power, and the direct-current power is smoothed.

According to the noncontact charging system 800, in a case where high-frequency power is applied to the primary coil 113, a current flowing through the primary coil 113 generates a magnetic field in the secondary coil 211. At this time, the magnetic field changes with a change in the current. As a result, a voltage is generated in the secondary coil 211 (electromagnetic induction). Here, a voltage value induced in the secondary coil 211 can be changed via a turn ratio between the primary coil 113 and the secondary coil 211. If the number of turns of the primary coil 113 is denoted by n1, the number of turns of the secondary coil 211 is denoted by n2, a voltage applied to the primary coil 113 is denoted by V1, and a voltage applied to the secondary coil 211 is denoted by V2, the voltage V2 is expressed by Eq. (1).

$$|V2|=n1/n2|V1| \tag{1}$$

For example, when a voltage of high-frequency power applied to the primary coil 113 is 100 V and a high-frequency voltage of 5 V is obtained in a secondary-coil side, the number of turns of the secondary coil is 1/20 the number of turns of the primary coil. Here, a generated alternating voltage is converted into a direct-current voltage by the AC-DC converter 212. Moreover, the direct-current voltage is rectified by the rectifier circuit 213. As a result of this, power supply and a charging process are performed for a signal processing unit that is not shown, the circuit 22 such as a load, and the rechargeable battery 23. Here, for efficient generation of a direct-current voltage in the terminal device 20 with respect to high-frequency power applied to the terminal device 20 from the power supply device 10, the primary coil 113 and the secondary coil 211 are provided in such a manner that the primary coil 113 and the secondary coil 211 are brought near to each other and the centers of both coils are aligned.

Moreover, in relation to a noncontact wireless electronic device, according to a data communication system utilizing a near-field wireless function, noncontact data communication processing is performed through an operation of putting or placing a terminal device on a data communication device. As terminal devices in this case, for example, a portable telephone, a digital camera, and the like are used. The data communication device (an application appliance) exchanges data such as still images, moving images, and music with these wireless electronic devices. Furthermore, as a noncontact data communication system, systems utilizing RF such as a wireless LAN, millimeter waves, and UWB are known as existing technologies.

For example, in relation to a near-field wireless system, Japanese Unexamined Patent Application Publication No. 2005-64822 (page 14, FIG. 3) discloses a wireless communication apparatus and a wireless communication system. According to this wireless communication apparatus, this wireless communication apparatus includes a data communication device and a terminal device, and data communication is performed utilizing reflected waves between the data communication device and the terminal device by a noncontact communication method. Compared with a case in which a terminal device and a data communication device are connected in a wired manner, if a device is configured like this, the degree of freedom of arrangement of terminal devices increases for the data communication device, handiness and convenience improve, and no connector is necessary. Thus, superior waterproof property and safety are obtained.

However, a wireless processing system according to an existing example has problems as in the following.

i. According to a noncontact charging system as seen in Japanese Registered Utility Model No. 3125341 (page 3, FIG. 1), Japanese Unexamined Patent Application Publication No. 2006-203997 (page 6, FIG. 4), and the like, a combination of a specific terminal device and a power supply device dedicated to the terminal device is provided. Thus, it is anticipated that since the power supply device cannot be used only for a specific terminal device, there may be a case in which many chargers are scattering around a user's house and since a charger of another device cannot be diverted, wasting of money and resources may be generated in a case where the power supply device (the charger) is lost.

ii. With respect to a problem as described above, there may be considered a method in which a general-purpose power supply device is used for various terminal devices; however, matching needs to be very strictly achieved between a wireless processing point of the power supply device and a wireless processing point of the terminal device for performing high-efficiency power supply in a noncontact manner. In this regard, a positional relationship between a primary coil of a power supply device and a secondary coil of a terminal device often varies between terminal-device models, and thus it is anticipated that alignment for performing preferable power-supply processing may be significantly difficult.

iii. According to a data communication system utilizing a near-field wireless function as seen in Japanese Unexamined Patent Application Publication No. 2005-64822 (page 14, FIG. 3), in a wireless communication method using millimeter waves, antenna directivity may be limited and the degree of freedom of arrangement of terminal devices may decrease for the data communication device. Moreover, even in a case in which a wireless communication method whose antenna directivity is generally thought of as being a wide antenna directivity, such as a wireless LAN, is used, there may be a case in which a data communication status is lowered depending on how terminal devices are placed. In this way, depending on an arrangement state of terminal devices with respect to a data communication device, there is apprehension that preferable communication cannot be executed to and from the data communication device.

DISCLOSURE OF INVENTION

A wireless processing system according to the present invention is a wireless processing system that achieves matching between antennas of two wireless electronic devices and performs wireless processing, and includes a first wireless electronic device that includes an antenna having a predetermined directivity and a display unit on a device mounting surface and performs wireless communication processing; and a second wireless electronic device that includes an antenna having a predetermined directivity, has terminal information used for achieving matching between antennas and used for achieving matching for the antenna with respect to the antenna of the first wireless electronic device, and performs wireless communication processing. The wireless processing system is characterized in that the first wireless electronic device receives the terminal information from the second wireless electronic device and displays an outer-shape image of the second wireless electronic device on the display unit in accordance with the terminal information.

According to the wireless processing system according to the present invention, in a case where matching is to be achieved between the antennas of the two wireless electronic devices and wireless processing is to be performed, the first wireless electronic device includes the antenna having the predetermined directivity and the display unit on the device mounting surface and performs wireless communication processing. The second wireless electronic device includes the antenna having the predetermined directivity, has the terminal information used for achieving matching between the antennas and used for achieving matching for the antenna with respect to the antenna of the first wireless electronic device, and performs wireless communication processing. For example, the terminal information is stored in the second wireless electronic device, and is outer-shape information for displaying a relationship between an outer-shape image and an antenna directivity of the second wireless electronic device in a position coordinate system used when matching is to be achieved for the antenna with respect to the antenna of the first wireless electronic device. In accordance with this, the first wireless electronic device receives the terminal information (outer-shape information) from the second wireless electronic device, and displays the outer-shape image of the second wireless electronic device on the display unit in accordance with this terminal information.

Thus, when matching is to be achieved between the antennas, if the second wireless electronic device is mounted so as to be aligned with the outer-shape image displayed on the display unit of the first wireless electronic device, matching can automatically be achieved between the two antennas in a self-matching manner, without the antenna directivity of the first wireless electronic device and the antenna directivity of the second wireless electronic device being aligned via visual checking of antenna appearances. Thus, in a state in which matching has been optimally achieved between the two antennas, a predetermined power can be supplied from the first wireless electronic device to the second wireless electronic device or desired communication processing can be executed between the first wireless electronic device and the second wireless electronic device.

A wireless processing method according to the present invention is a wireless processing method for achieving matching between two antennas of a first wireless electronic device and a second wireless electronic device, the first wireless electronic device including an antenna having a predetermined directivity and a display unit on a device mounting surface and performing wireless communication processing and the second wireless electronic device including an antenna having a predetermined directivity, having terminal information used for achieving matching between antennas and used for achieving matching for the antenna with respect to the antenna of the first wireless electronic device, and performing wireless communication processing, and is characterized in that when matching is to be achieved between the antennas, the second wireless electronic device sends the terminal information to the first wireless electronic device and the first wireless electronic device receives the terminal information from the second wireless electronic device and displays an outer-shape image of the second wireless electronic device on the display unit in accordance with the terminal information.

According to the wireless processing method according to the present invention, in a case where matching is to be achieved between the antennas of the two wireless electronic devices and wireless processing is to be performed, if the second wireless electronic device is mounted so as to be aligned with the outer-shape image displayed on the display unit of the first wireless electronic device, matching can automatically be achieved between the two antennas in a self-matching manner, without the antenna directivity of the first wireless electronic device and the antenna directivity of the second wireless electronic device being aligned via visual checking of antenna appearances. Thus, in a state in which matching has been optimally achieved between the two antennas, a predetermined power can be supplied from the first wireless electronic device to the second wireless electronic device or desired communication processing can be executed between the first wireless electronic device and the second wireless electronic device.

A first wireless electronic device according to the present invention is a wireless electronic device that is applicable to a system that achieves matching between antennas of two wireless electronic devices and performs wireless processing, and includes an antenna having a predetermined directivity; a display unit provided on a device mounting surface and used when matching is to be achieved for the antenna; and a wireless processing unit that performs wireless communication processing to and from another wireless electronic device mounted on the display unit. If information for displaying a relationship between an outer-shape image and an antenna directivity of the other wireless electronic device in a position coordinate system used when matching is to be achieved for the antenna of the wireless electronic device is treated as outer-shape information, the first wireless electronic device is characterized in that the wireless processing unit receives the outer-shape information from the other wireless electronic device and displays the outer-shape image of the other wireless electronic device based on the outer-shape information on the display unit.

According to the first wireless electronic device according to the present invention, in a case where matching is to be achieved between the antennas of the two wireless electronic devices and wireless processing is to be performed, the wireless processing unit includes an antenna having a predetermined directivity and performs wireless communication processing to and from the other wireless electronic device mounted on the display unit provided on the device mounting surface and used when matching is to be achieved for this antenna. In accordance with this, the wireless processing unit receives, from the other wireless electronic device, the outer-shape information for displaying a relationship between the outer-shape image and the antenna directivity of the other wireless electronic device in the position coordinate system used when matching is to be achieved for the antenna of the wireless electronic device, and displays the outer-shape image of the other wireless electronic device based on this outer-shape information on the display unit.

Thus, if the other wireless electronic device is mounted so as to be aligned with the outer-shape image displayed on the display unit, matching can automatically be achieved between the two antennas in a self-matching manner, without the antenna directivity of the first wireless electronic device and the antenna directivity of the other wireless electronic device being aligned via visual checking of antenna appearances. Thus, in a state in which matching has been optimally achieved between the two antennas, a predetermined power can be supplied from the first wireless electronic device to the other wireless electronic device or desired communication processing can be executed between the first wireless electronic device and the other wireless electronic device.

A second wireless electronic device according to the present invention is a wireless electronic device that is applicable to a system that achieves matching between antennas of two wireless electronic devices including a wireless electronic device provided with a display unit on a device mounting surface, and includes an antenna having a predetermined directivity; a storage unit that stores outer-shape information for displaying a relationship between an outer-shape image and the directivity of the antenna of the wireless electronic device in a position coordinate system used when matching is to be achieved for the antenna with respect to an antenna of the wireless electronic device provided with the display unit; and a wireless processing unit that performs wireless communication processing in accordance with the outer-shape information read from the storage unit. The second wireless electronic device is characterized in that when matching is to be achieved between the antennas, the wireless processing unit sends the outer-shape information to the wireless electronic device provided with the display unit.

According to the second wireless electronic device according to the present invention, in a case where matching is to be achieved between the antennas of the two wireless electronic devices and wireless processing is to be performed, the wireless processing unit includes an antenna having a predetermined directivity and performs wireless communication processing by reading, from the storage unit, the outer-shape information for displaying a relationship between the outer-shape image and the directivity of the antenna of the second wireless electronic device in the position coordinate system used when matching is to be achieved for the antenna with respect to the antenna of another wireless electronic device. In accordance with this, the wireless processing unit sends the outer-shape information to the wireless electronic device provided with the display unit on the device mounting surface when matching is to be achieved between the antennas.

Thus, if the second wireless electronic device is mounted so as to be aligned with the outer-shape image displayed on the display unit of the wireless electronic device provided with the device mounting surface, matching can automatically be achieved between the two antennas in a self-matching manner, without the antenna directivity of the wireless electronic device provided with the device mounting surface and the antenna directivity of the second wireless electronic device being aligned via visual checking of antenna appearances. Thus, in a state in which matching has been optimally achieved between the two antennas, a predetermined power can be supplied from the wireless electronic device provided with the device mounting surface to the second wireless electronic device or desired communication processing can be executed between the wireless electronic device provided with the device mounting surface and the second wireless electronic device.

A third wireless electronic device according to the present invention is a wireless electronic device that is applicable to a system that achieves matching between antennas of two wireless electronic devices and performs wireless processing, and includes an antenna having a predetermined directivity; a display unit provided on a device mounting surface and used when matching is to be achieved for the antenna; a wireless processing unit that performs wireless communication processing to and from another wireless electronic device mounted on the display unit; and a storage unit that stores, if information for displaying a relationship between an outer-shape image and the directivity of the antenna of the wireless electronic device in a position coordinate system used when matching is to be achieved for the antenna with respect to an antenna of the other wireless electronic device is treated as outer-shape information and information used to read the outer-shape information is treated as identification information, the outer-shape information. The third wireless electronic device is characterized in that the wireless processing unit receives the identification information from the other wireless electronic device, reads outer-shape information regarding the other wireless electronic device based on the identification information from the storage unit, and displays an outer-shape image of the other wireless electronic device on the display unit in accordance with the outer-shape information.

According to the third wireless electronic device according to the present invention, in a case where matching is to be achieved between the antennas of the two wireless electronic devices and wireless processing is to be performed, the wireless processing unit includes an antenna having a predetermined directivity and performs wireless communication processing to and from the other wireless electronic device mounted on the display unit provided on the device mounting surface and used when matching is to be achieved for this antenna. In accordance with this, when matching is to be achieved between the antennas, the wireless processing unit receives the identification information from the other wireless electronic device, reads the outer-shape information regarding the other wireless electronic device based on this identification information, and displays the outer-shape image on the display unit in accordance with this outer-shape information.

Thus, if the other wireless electronic device is mounted so as to be aligned with the outer-shape image displayed on the display unit of the third wireless electronic device, matching can automatically be achieved between the two antennas in a self-matching manner, without the antenna directivity of the third wireless electronic device and the antenna directivity of the other wireless electronic device being aligned via visual checking of antenna appearances. Thus, in a state in which matching has been optimally achieved between the two antennas, a predetermined power can be supplied from the third wireless electronic device to the other wireless electronic device or desired communication processing can be executed between the third wireless electronic device and the other wireless electronic device.

A fourth wireless electronic device according to the present invention is a wireless electronic device that is applicable to a system that achieves matching between antennas of two wireless electronic devices including a wireless electronic device provided with a display unit on a device mounting surface and performs wireless processing, and includes an antenna having a predetermined directivity; a storage unit that stores identification information used to read outer-shape information for displaying a relationship between an outer-shape image and the directivity of the antenna of the wireless electronic device in a position coordinate system used when matching is to be achieved for the antenna with respect to an antenna of the wireless electronic device provided with the display unit; and a wireless processing unit that performs wireless communication processing in accordance with the identification information read from this storage unit. The fourth wireless electronic device is characterized in that when matching is to be achieved between the antennas, the wireless processing unit sends the identification information to the wireless electronic device provided with the display unit on the device mounting surface.

According to the fourth wireless electronic device according to the present invention, in a case where matching is to be achieved between the antennas of the two wireless electronic devices, the wireless processing unit includes an antenna having a predetermined directivity and if information for displaying a relationship between the outer-shape image and the directivity of the antenna of the fourth wireless electronic device in the position coordinate system used when matching is to be achieved for the antenna with respect to an antenna of the wireless electronic device provided with the display unit on the device mounting surface is treated as outer-shape information, the wireless processing unit reads, from the storage unit, the recognition information used to read this outer-shape information, and performs wireless communication processing.

In accordance with this, when matching is to be achieved between the antennas, the wireless processing unit sends the recognition information to the wireless electronic device provided with the display unit on the device mounting surface.

Thus, in the wireless electronic device provided with the device mounting surface, the outer-shape information based on the identification information is read, the outer-shape image based on this outer-shape information is displayed on the display unit, and if the fourth wireless electronic device is mounted so as to be aligned with this outer-shape image, matching can automatically be achieved between the two antennas in a self-matching manner, without the antenna directivity of the wireless electronic device provided with the device mounting surface and the antenna directivity of the second wireless electronic device being aligned via visual checking of antenna appearances. Thus, in a state in which matching has been optimally achieved between the two antennas, a predetermined power can be supplied from the wireless electronic device provided with the device mounting surface to the second wireless electronic device or desired communication processing can be executed between the wireless electronic device provided with the device mounting surface and the fourth wireless electronic device.

BRIEF DESCRIPTION OF DRAWINGS

FIG. 3 is a block diagram showing exemplary internal structures of a power supply device 1 and a terminal device 2 in the power supply system 100.

FIG. 4B is a diagram showing an exemplary image of terminal information D0 according to a portable telephone 2a.

BEST MODES FOR CARRYING OUT THE INVENTION

An object of this invention is to provide a wireless processing system, a wireless processing method, and a wireless electronic device that can achieve matching between optimal wireless processing points of two wireless electronic devices and that can supply a predetermined power from one wireless electronic device to another wireless electronic device or execute desired communication processing between two wireless electronic devices. In the following, embodiments of a wireless processing system, a wireless processing method, and a wireless electronic device according to this invention will be described with reference to the drawings.

[First Embodiment]

Figure 2:
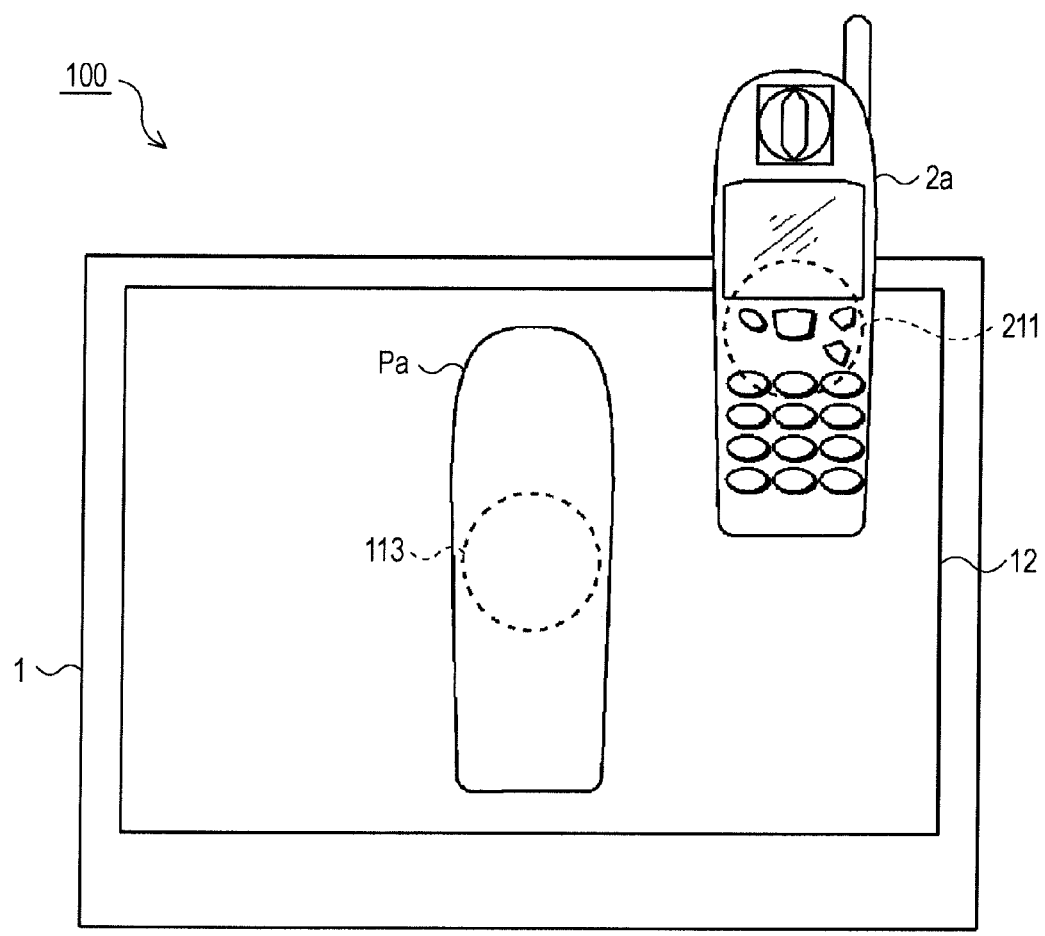
FIG. 2 is a diagram showing an exemplary structure of a wireless power supply system 100 as a first embodiment according to the present invention.

A power supply system 100 shown in FIG. 2 functions as a wireless processing system as a first embodiment, and is a system that achieves matching between two wireless electronic devices such as a power supply device 1 having a near-field wireless communication function and a portable telephone 2a having the same function and performs a wireless (noncontact) charging process. The power supply device 1 functions as a first wireless electronic device, has a casing having a predetermined shape, includes a primary coil (hereinafter referred to as an antenna coil 113) that also functions as an antenna having a predetermined directivity within the casing of the power supply device 1, and performs wireless communication processing. A display function unit 12 is provided on the top surface of the casing. In this example, the top surface of the display function unit 12 is a device mounting surface. The antenna coil 113 has, for example, a circular shape, and is fixed on the back side of the display function unit 12. As the power supply device 1, a noncontact charger having a universal near-field wireless communication function is used which performs charging when a terminal device 2 such as the portable telephone 2a or a portable audio player (hereinafter referred to as a music player 2b) is put on the device mounting surface.

The terminal device 2 such as the portable telephone 2a or the music player 2b functions as a second wireless electronic device, includes a secondary coil (hereinafter referred to as an antenna coil 211) that also functions as an antenna having a predetermined directivity and terminal information D0 used for achieving matching between antennas and used for achieving matching for the antenna coil 211 with respect to the antenna coil 113 of the power supply device 1, and performs wireless communication processing. The antenna coil 211 also has a circular shape, and is arranged inside a casing of the portable telephone 2a on the back side thereof. As the terminal device 2 such as the portable telephone 2a or the music player 2b, a device having, for example, a 2.45 GHz-band near-field wireless communication function, such as Bluetooth (Bluetooth), is used.

In this example, when a user brings these terminal devices 2 near to the power supply device 1, for example, an outer-shape image Pa of the portable telephone 2a is displayed in such a manner that it gradually emerges on the display function unit 12. At this time, the outer-shape image Pa is displayed on the display function unit 12 in a layout in which the center coordinates of the circular shape of the antenna coil 113 of the power supply device 1 match the center coordinates of the circular shape of the antenna coil 211 of the portable telephone 2a and that enables high-efficiency power supply. Next, with reference to FIG. 3, exemplary internal structures of the power supply device 1 and terminal device 2 in a power supply system 100 will be described. In this example, an exemplary structure of the power supply device 1 and an exemplary structure of the terminal device 2 are separately described.

(Exemplary Structure of Power Supply Device)

The power supply device 1 shown in FIG. 3 has a near-field wireless communication function and a wireless power charging (supplying) function. Furthermore, the power supply device 1 has a function of receiving the terminal information D0 from the terminal devices 2 and displaying outer-shape images Pa and Pb of the portable telephone 2a, the music player 2b, and the like in accordance with this terminal information D0.

Figure 1:
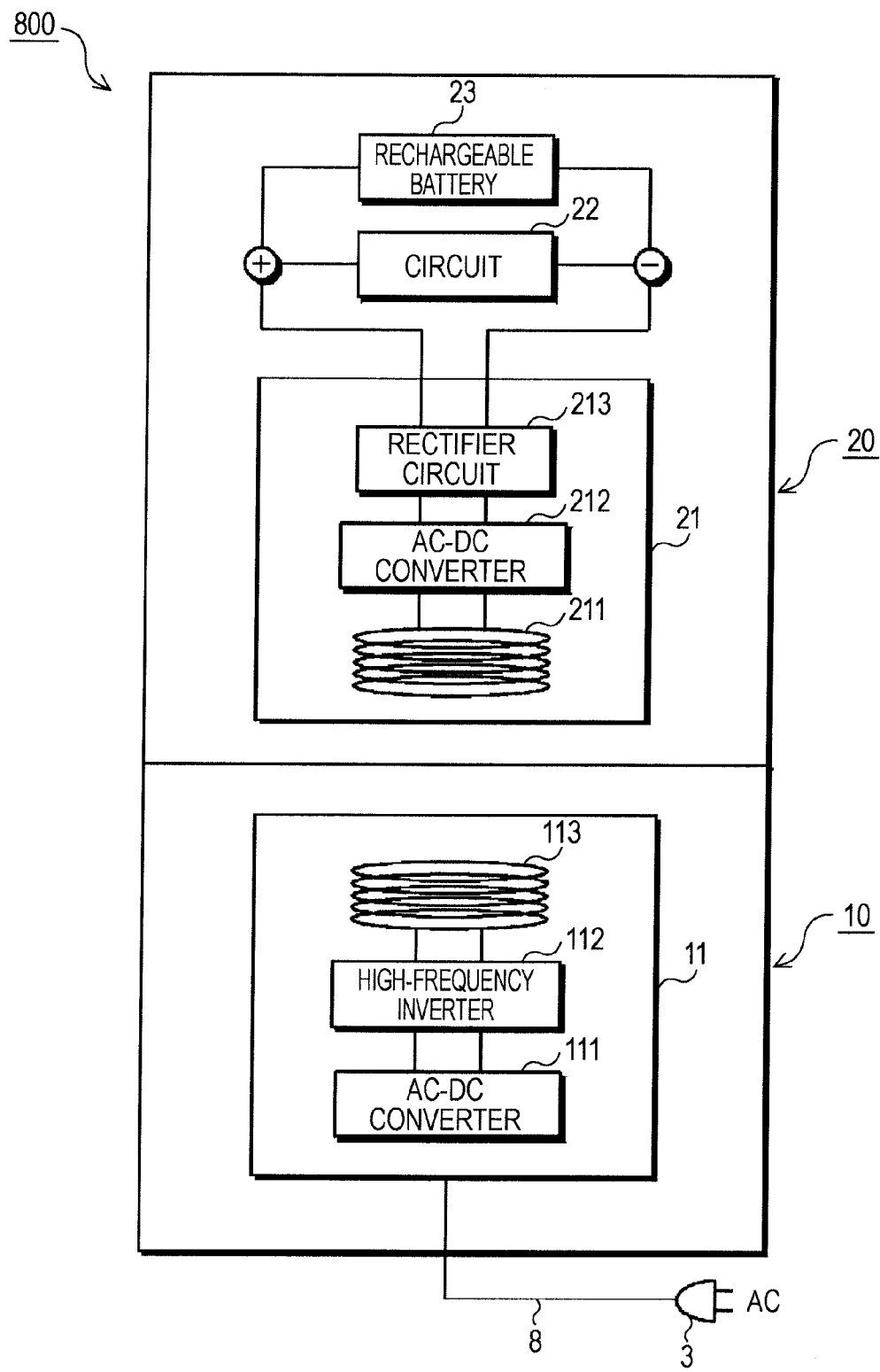
FIG. 1 is a diagram showing an exemplary internal structure of a noncontact charging system 800 according to an existing example.

The power supply device 1 includes, for example, the power transmission function unit 11, the display function unit 12, a wireless communication function unit 13, a main control unit 14, and a coupling capacitance 114. The power transmission function unit 11 includes the AC-DC converter 111, the high-frequency inverter 112, and the antenna coil 113. For the antenna coil 113, its inductance is one of parameters used to give an oscillating frequency to the high-frequency inverter 112. The oscillating frequency is determined in accordance with a structure (the conductance) of the high-frequency inverter 112. The inductance of the antenna coil 113 is determined by parameters indicating, for example, the material and thickness of the wire or the diameter and the number of turns of the antenna coil 113. Thus, the diameter and the number of turns of the antenna coil 113 are determined by the oscillating frequency, the conductance of the high-frequency inverter, and the material and thickness of the wire of the coil. With respect to these functions, since the power transmission function unit 11 in the existing method shown in FIG. 1 can be used, description thereof will be omitted.

In this example, the wireless communication function unit 13 is connected to the antenna coil 113 via the coupling capacitance 114, and performs wireless communication processing to and from the terminal device 2 such as the portable telephone 2a or the music player 2b that are brought near to the device mounting surface and then mounted on the device mounting surface. For example, the wireless communication function unit 13 sends a beacon frame F1 at regular time intervals, receives a terminal notification request frame F2 from the portable telephone 2a that is brought near to the device mounting surface, and receives outer-shape information D1 (see FIG. 7). The wireless communication function unit 13 is provided with a 2.45 GHz-band near-field wireless communication function, such as Bluetooth (Bluetooth). In other words, a data communication method that has a function for performing wireless communication processing to and from the portable telephone 2a or the like and that is applied to a near-field wireless communication such as, for example, RFID needs to be provided.

The main control unit 14 is connected to the wireless communication function unit 13, and controls input/output of the power transmission function unit 11, the display function unit 12, and the wireless communication function unit 13 in a centralized manner. For example, the main control unit 14 receives the outer-shape information D1 and coordinate information D2 that the wireless communication function unit 13 received from the portable telephone 2a, outputs the outer-shape information D1 and coordinate information D2 to the display function unit 12, and performs display control in such a manner that the outer-shape image Pa of the portable telephone 2a is displayed on the device mounting surface. The main control unit 14 is constituted by a CPU (central processing unit), a ROM (read-only memory), a RAM (memory into and from which information can be randomly written and read), and the like.

The display function unit 12 is connected to the main control unit 14 and has a function of displaying the outer-shape image Pa of the terminal device 2 such as the portable telephone 2a or the music player 2b on the device mounting surface. In this example, before the portable telephone 2a or the like is mounted on the device mounting surface, the display function unit 12 obtains the outer-shape information D1 and displays the outer-shape image Pa of the portable telephone 2a or the like based on this. That is, the outer-shape image Pa is displayed on the device mounting surface on the display function unit 12 before the portable telephone 2a, the music player 2b, or the like is mounted on the device mounting surface. This is performed so as to show a user a way of mounting the portable telephone 2a or the music player 2b. As the display function unit 12, for example, a liquid crystal display device, or a display device capable of displaying by projection is used.

If the power supply device 1 is configured like this, in a case where matching is to be achieved between the antenna coils 113 and 211 between the power supply device 1 and the portable telephone 2a and a wireless charging process is to be performed, the wireless communication function unit 13 receives the outer-shape information D1 from the portable telephone 2a. The display function unit 12 displays the outer-shape image Pa of the portable telephone 2a based on this outer-shape information D1. For example, the outer-shape image Pa that indicates a power supply point and the outer-shape image Pa that indicates a data communication point are displayed as one image on the display function unit 12 on the device mounting surface of the power supply device 1. Thus, if the portable telephone 2a is mounted so as to be aligned with the outer-shape image Pa displayed on the display function unit 12, matching can automatically be achieved between the two antenna coils 113 and 211 in a self-matching manner without the directivity of the antenna coil 113 of the power supply device 1 and the directivity of the antenna coil 211 of the portable telephone 2a being aligned via visual checking of antenna appearances.

(Exemplary Structure of Terminal Device)

The terminal device 2 for which the above-described power supply device 1 performs a charging process is a wireless electronic device such as the portable telephone 2a or the music player 2b, and can be applied in the power supply system 100. The terminal device 2 has the terminal information D0. Here, the terminal information D0 is information managed by the terminal device 2. The terminal information D0 includes the outer-shape information D1 and the coordinate information D2. Here, the outer-shape information D1 is information for displaying a relationship between the outer-shape image Pa and an antenna directivity of the portable telephone 2a (subject device) in a position coordinate system used when matching is to be achieved between the antennas through the display function unit 12 of the power supply device 1. The coordinate information D2 is information used to inform the power supply device 1 of an optimal power supply point.

The terminal device 2 includes, for example, the power receiving function unit 21, the circuit 22, the rechargeable battery 23, a wireless communication function unit 24, a main control unit 25, a terminal-information storing unit 26, and a coupling capacitance 214 as shown in FIG. 3. The power receiving function unit 21 includes the antenna coil 211, the AC-DC converter 212, and the rectifier circuit 213. As the antenna coil 211, an antennal coil having a predetermined directivity is used. With respect to these functions, the power receiving function unit 21 in the existing method shown in FIG. 1 can be used, and thus description thereof will be omitted.

The rechargeable battery (battery) 23 is connected to the rectifier circuit 213, and is charged by the power supply device 1 at a direct-current power at which a charging process is performed. The circuit 22, the wireless communication function unit 24, the main control unit 25, and the terminal-information storing unit 26 are connected to the rechargeable battery 23. From the rechargeable battery 23, a driving voltage is applied to these circuits and the like. The circuit 22 is a module block having a portable-telephone function and a music-player function.

The wireless communication function unit 24 is connected to the antenna coil 211 via the coupling capacitance 214, and performs wireless communication processing to and from the power supply device 1. For example, when matching is to be achieved between the antennas, the wireless communication function unit 24 sends the outer-shape information D1 read from the terminal-information storing unit 26 to the power supply device 1. Similarly to the wireless communication function unit 13, the wireless communication function unit 24 is provided with a 2.45 GHz-band near-field wireless communication function or a data communication method that can be applied to near-field wireless communication, such as RFID.

The main control unit 25 is connected to the wireless communication function unit 24, and controls input/output of the circuit 22, the wireless communication function unit 24, and the terminal-information storing unit 26. Similarly to the main control unit 14 of the power supply device 1, the main control unit 25 is constituted by a CPU (central processing unit), a ROM (read-only memory), a RAM (memory into and from which information can be randomly written and read), and the like, and controls, for example, part of the terminal device 2 or the entire terminal device 2.

The terminal-information storing unit 26 functioning as a storage unit is connected to the main control unit 25, and stores the terminal information D0 unique to a terminal device such as the portable telephone 2*a* or the music player 2*b*. The terminal information D0 is the outer-shape information D1+the coordinate information D2. In the terminal-information storing unit 26, for example, the coordinate information D2 that indicates a predetermined power supply point and the coordinate information D2 that indicates a predetermined data communication point are stored as the same value. Here, in addition to the terminal information D0, telephone-number information, user information, and the like are stored.

As the terminal-information storing unit 26, a nonvolatile memory such as an EEPROM (electrically information erasable programmable ROM) or a fixed storage disk device (hard disk: HDD) is used. Nonvolatile memories are memories into which data can be written as necessary and that hold data even when the power is turned off. The outer-shape information D1 and the coordinate information D2 are used to display the outer-shape image Pa of the portable telephone 2*a* or the like. The terminal information D0 is expressed using, for example, bitmap information.

When the terminal device 2 is configured in this way, in a case where matching is to be achieved between two antenna coils 113 and 211 and a wireless charging process is to be performed, the wireless communication function unit 24 sends the outer-shape information D1 to the power supply device 1 when matching is to be achieved between the antennas. Thus, if the portable telephone 2*a* or the like is mounted so as to be aligned with the outer-shape image Pa displayed on the display function unit 12 of the power supply device 1, matching can automatically be achieved between the two antenna coils 113 and 211 in a self-matching manner, without the antenna directivity of the power supply device 1 and the antenna directivity of the terminal device 2 being aligned via visual checking of antenna appearances. Thus, high-efficiency power supply can be performed to the terminal device 2, and the power supply system 100 which is more sophisticated than the charging system 800 utilizing an existing method can be configured.

Figure 4A:
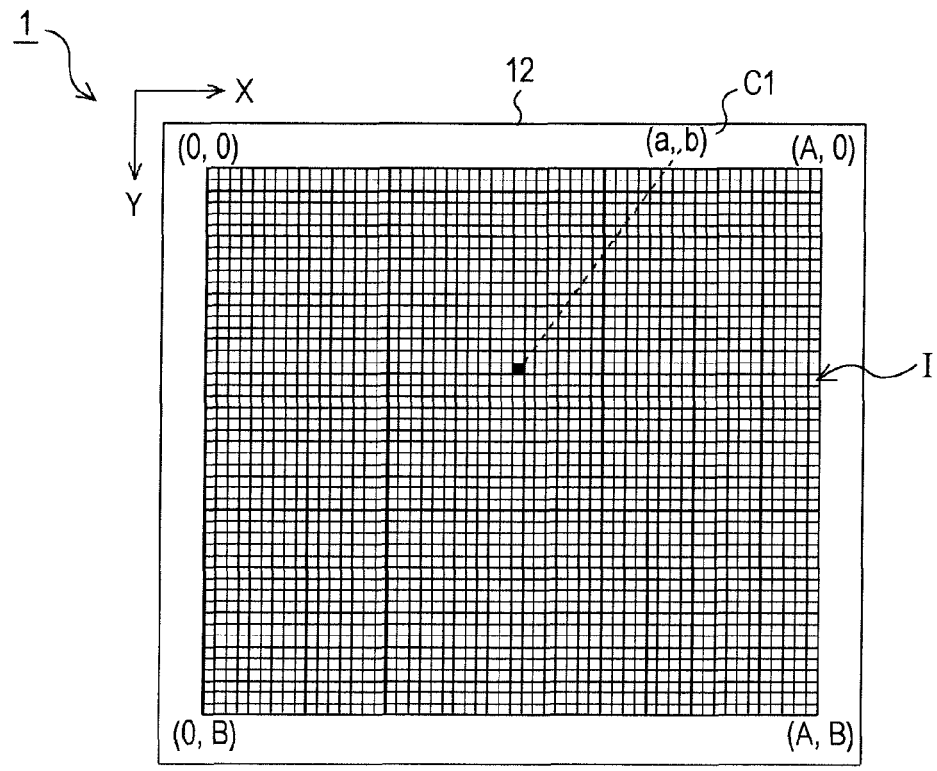
FIG. 4A is a diagram showing an exemplary display area of a display function unit 12.

Next, with reference to FIG. 4A and FIG. 4B, an exemplary display area of the display function unit 12 and an exemplary image of the terminal information D0 will be described. The display function unit 12 of the power supply device 1 shown in FIG. 4A has a display area I. The display area I has a matrix shape in which the number of pixels in a horizontal direction (in a row direction) is A and the number of pixels in a vertical direction (in a column direction) is B. If expressed in a position coordinate system XY defined on the device mounting surface of the display function unit 12, the display area I is expressed in coordinates $(x, y)=(0, 0)$ to $(A, 0)$ in a row direction and is expressed in coordinates $(x, y)=(0, B)$ to coordinates $(A, B)$ in a column direction. In this example, coordinates $(x, y)=(a, b)$ at the center of the circular shape of the antenna coil 113 (primary coil) are set, the coordinate information D2 indicating the coordinates $(a, b)$ is a specified bit indicating a power supply point for the power supply device 1.

Figure 4B:
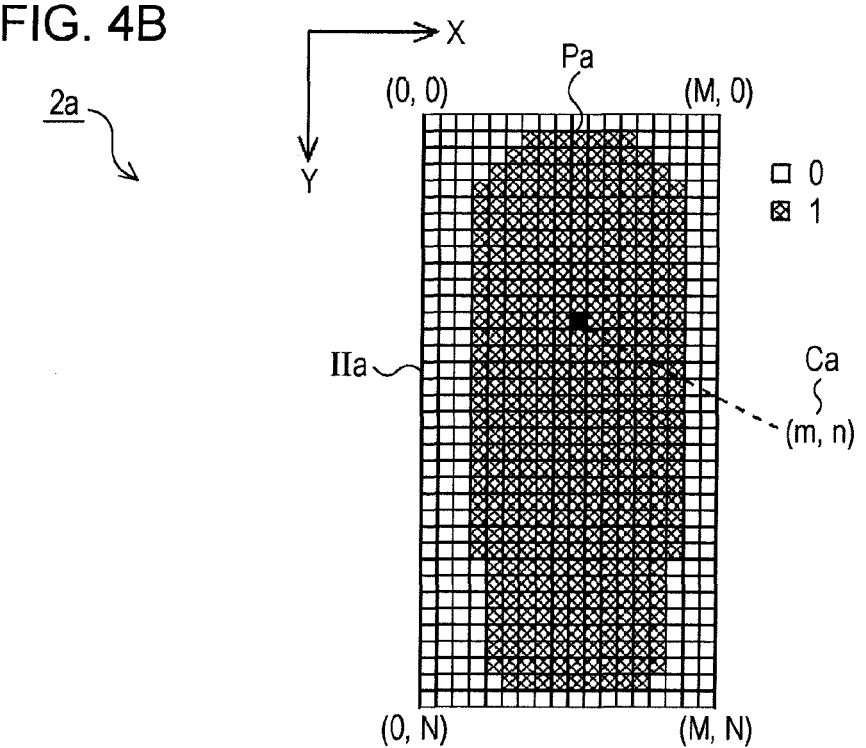

According to an exemplary image of the terminal information D0 shown in FIG. 4B, the outer-shape image Pa of the portable telephone 2*a* or the like is displayed on a bitmap area IIa in digital representation. The bitmap area IIa has a matrix shape (M×N bits) in which M-bit pixels are arranged in a horizontal direction (in a row direction) and N-bit pixels are arranged in a vertical direction (in a column direction). The terminal information D0 is expressed in the bitmap area IIa having M×N bits. The dimensions of bitmap are the same as the dimensions of the display device of the power supply device 1. That is, if expressed in the position coordinate system XY defined on the device mounting surface of the display function unit 12, the bitmap area IIa is expressed in coordinates $(x, y)=(0, 0)$ to $(M, 0)$ in a row direction and coordinates $(x, y)=(0, N)$ to coordinates $(M, N)$ in a column direction. In this example, coordinates $(x, y)=(m, n)$ at the center of the circular shape of the antenna coil 211 (secondary coil) are set, the coordinate information D2 indicating the coordinates $(m, n)$ is a specified bit indicating a power supply point for the portable telephone 2*a*.

In this example, in response to $(0, 1)$ of each bit, the outer-shape image Pa is developed (expressed) in the bitmap area IIa. The outer-shape image Pa is an image obtained by making a displayable silhouette-like image of the exterior shape of the portable telephone 2*a*, for example, the projected shape of the exterior shape of the portable telephone 2*a*. In the outer-shape image Pa of the portable telephone 2*a* in this bitmap area IIa, a logical value in a solid black portion is, for example, "0". Portions that are not included in the outer shape and surround this outer-shape image Pa are expressed by white square portions whose logical value is "1". This is because the outer-shape image Pa is displayed on the bitmap area IIa in digital representation. In this way, the terminal information D0 is expressed using bitmap information such as the outer-shape information D1 and the coordinate information D2.

Figure 5:
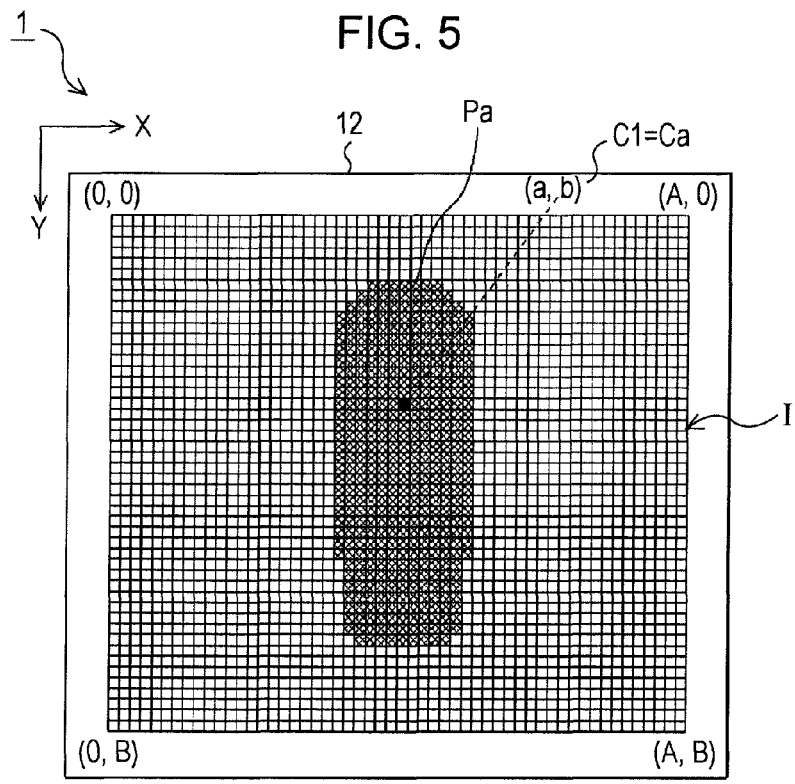
FIG. 5 is a diagram showing an example of an outer-shape image Pa displayed on the display function unit 12.

Next, with reference to FIG. 5, an example of the outer-shape image Pa displayed on the display function unit 12 will be described. According to the example of the displayed outer-shape image Pa shown in FIG. 5, in the position coordinate system XY defined on the device mounting surface of the display function unit 12, the main control unit 14 controls the display function unit 12 in such a manner that the coordinate information D2 indicating the coordinates $(x, y)=(a, b)$ matches the coordinate information D2 indicating the coordinates $(x, y)=(m, n)$.

In this example, the coordinates $(x, y)=(0, 0)$ to $(M, 0)$ in a row direction of the bitmap area IIa are allocated to the coordinates $(x, y)=(0, 0)$ to $(A, 0)$ in a row direction of the display area I, and the coordinates (x, y)=(0, 0) to (0, N) in a column direction of the bitmap area IIa are allocated to the coordinates (x, y)=(0, 0) to (0, B) in a column direction of the display area I, respectively. Thus, the center (coordinate) portion of the circular shape of the antenna coil 113 (primary coil), which is a specified bit of the power supply point for the power supply device 1, can match the center (coordinate) portion of the circular shape of the antenna coil 211 (secondary coil).

Next, with reference to FIG. 6, exemplary charge characteristics for the power supply system 100 will be described. In exemplary charge characteristics shown in FIG. 6, the vertical axis represents battery voltage (V) of the rechargeable battery 23 of the portable telephone 2a or the like, its charging current (A), and its charge percent (%). The horizontal axis represents charging time (H). There are charging conditions, for example, a charging current (C. C) is 1020 mA and a charging voltage (C. V) is 4.2 V. A charging current is a current value to be supplied to the rechargeable battery 23 from the rectifier circuit 213. A charging voltage is a voltage value applied to the rechargeable battery 23 by the rectifier circuit 213. A charging time (C. T) is 2.5H. An ambient temperature is 20° C. A charging time is a time period during which AC power is supplied from the antenna coil 113 (primary coil) in the power supply device 1 to the antenna coil 211 in the portable telephone 2a by means of induction.

Figure 6:
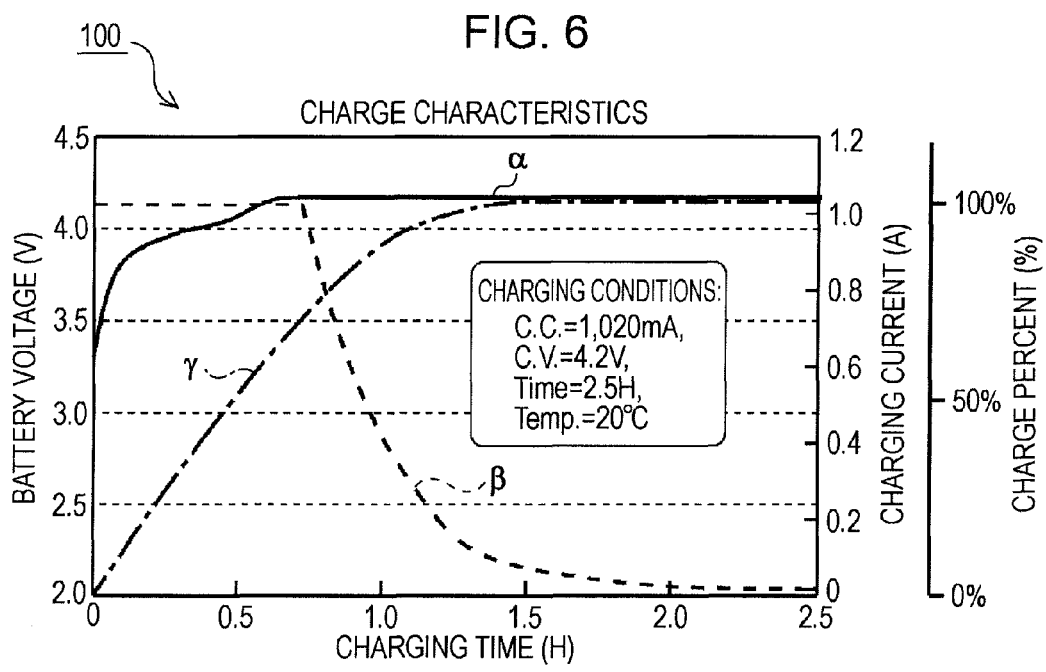
FIG. 6 is a graph showing exemplary charge characteristics for the power supply system 100.

A solid line shown in FIG. 6 represents battery voltage characteristic α of the rechargeable battery 23, and a broken line represents its charging current characteristic β and an alternate-long-and-short-dash line represents its charge percent characteristic γ. In this example, at a time when 0.8H of charging time elapses from a charging start time (AC power supply start time), the battery voltage recovers like the battery voltage characteristic α represented by the solid like, the charged level recovers to about 75%, and the charging current starts to decrease like the charging current characteristic β represented by the broken line. When the charging time reaches 2.5H, full charge (100%) is achieved like the charge percent characteristic γ represented by the alternate-long-and-short-dash line.

Figure 7:
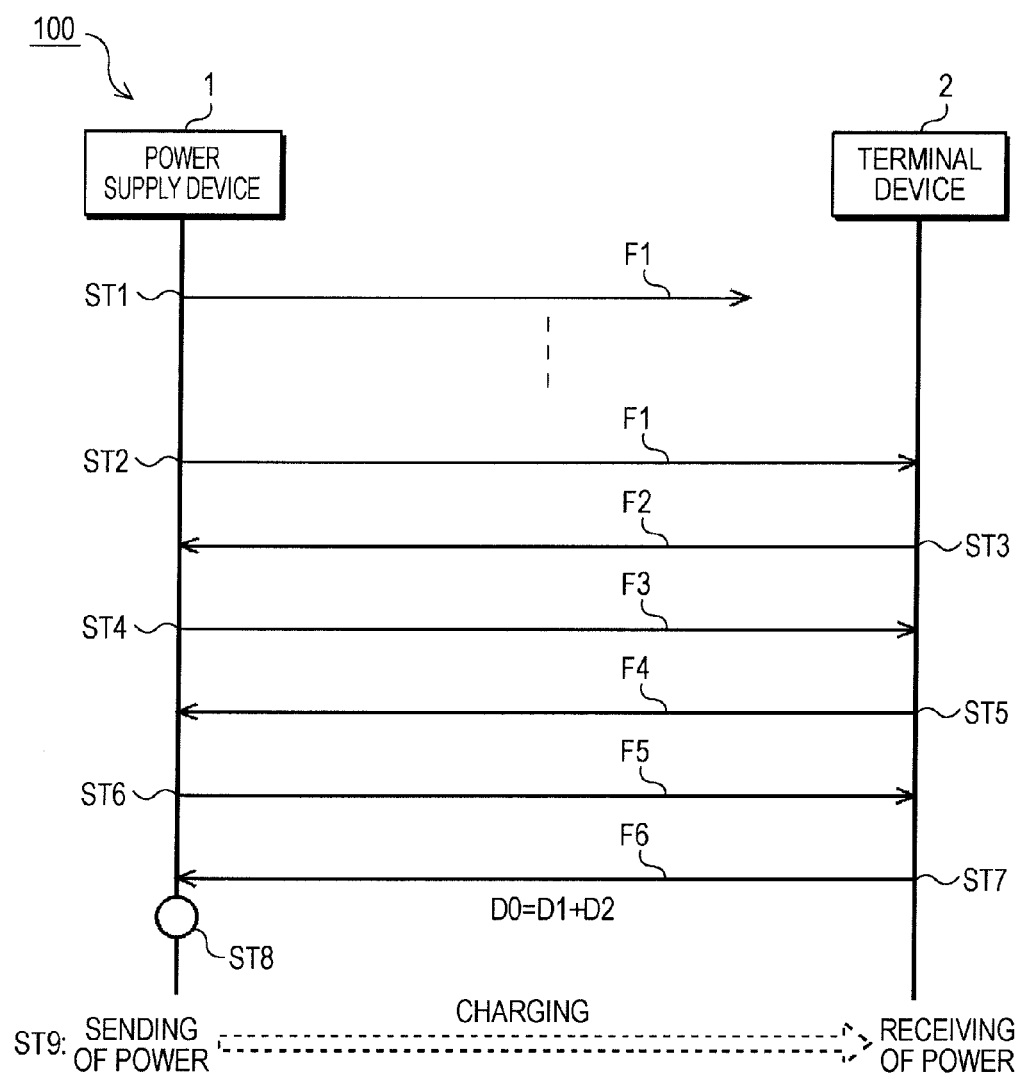
FIG. 7 is a sequence chart showing an exemplary charging process performed in the power supply system 100.

Next, with respect to a wireless processing method according to the present invention, an exemplary charging process in the power supply system 100 will be described with reference to FIG. 7. A sequence chart shown in FIG. 7 is a frame sequence in wireless communication processing performed between the power supply device 1 and the portable telephone 2a.

In this example, a case is assumed in which a wireless charging process is performed between the power supply device 1 that includes the antenna coil 113 having a predetermined directivity and the display function unit 12 on the device mounting surface and performs wireless communication processing and the terminal device 2 that includes the antenna coil 211 having a predetermined directivity, has the terminal information D0 used for achieving matching between antennas and used for achieving matching for the antenna coil 211 with respect to the antenna coil 113, and performs wireless communication processing. A case in which, when matching is to be achieved between the antennas, the portable telephone 2a sends the terminal information D0 to the power supply device 1 and the power supply device 1 receives the terminal information D0 from the portable telephone 2a and displays the outer-shape image Pa of the portable telephone 2a on the display function unit 12 in accordance with the terminal information D0 will be described as an example.

In step ST1, the power supply device 1 transmits a beacon frame F1 at regular time intervals. If a user brings the portable telephone 2a or the like near to the power supply device 1, in step ST2, the portable telephone 2a receives the transmitted beacon frame F1. In response to this beacon frame F1, in step ST3, the portable telephone 2a sends a terminal notification frame F2 to the power supply device 1. The power supply device 1 receives the terminal notification frame F2 from the portable telephone 2a, and sends a connection request frame F3 to the portable telephone 2a in step ST4. Thereafter, the portable telephone 2a receives the connection request frame F3, and sends a connection response frame F4 to the power supply device 1 in step ST5.

The power supply device 1 receives the connection response frame F4 from the portable telephone 2a, and sends a terminal-information request frame F5 to the portable telephone 2a in step ST6. Thereafter, the portable telephone 2a receives the terminal-information request frame F5, and sends a terminal-information response frame F6 to the power supply device 1 in step ST7. At this time, in the portable telephone 2a, the terminal information D0 is read from the terminal-information storing unit 26, the terminal information D0 is written into (added to) the terminal-information response frame F6, and the terminal-information response frame F6 is sent to the power supply device 1. The terminal information D0 is the outer-shape information D1+the coordinate information D2.

Next, the power supply device 1 receives the terminal-information response frame F6 from the portable telephone 2a, and displays the outer-shape image Pa of the portable telephone 2a on the display function unit 12 in step ST8. In this example, the bitmap information regarding the portable telephone 2a shown in FIG. 4B is assigned to the display area I shown in FIG. 4A and the outer-shape image Pa of the portable telephone 2a as shown in FIG. 5 is displayed on the display function unit 12 of the power supply device 1. At this time, the power supply device 1 causes the coordinate information D2 indicating the power supply point for the portable telephone 2a to match the coordinate information D2 indicating the power supply point of the power supply device 1, and displays the outer-shape image Pa.

In the above-described frame sequence, everything is automatically performed, the user operation in which the portable telephone 2a is brought near to the power supply device 1 causes the power supply device 1 to halt after displaying of the outer shape of the portable telephone 2a. Then, a user who handles the portable telephone 2a mounts the portable telephone 2a so as to be aligned with the outer-shape image Pa displayed on the display function unit 12 of the power supply device 1. Thereafter, in step ST9, a wireless charging process is performed from the power supply device 1 to the portable telephone 2a. The power supply device 1 sends power, and the portable telephone 2a receives the power.

Figure 8:
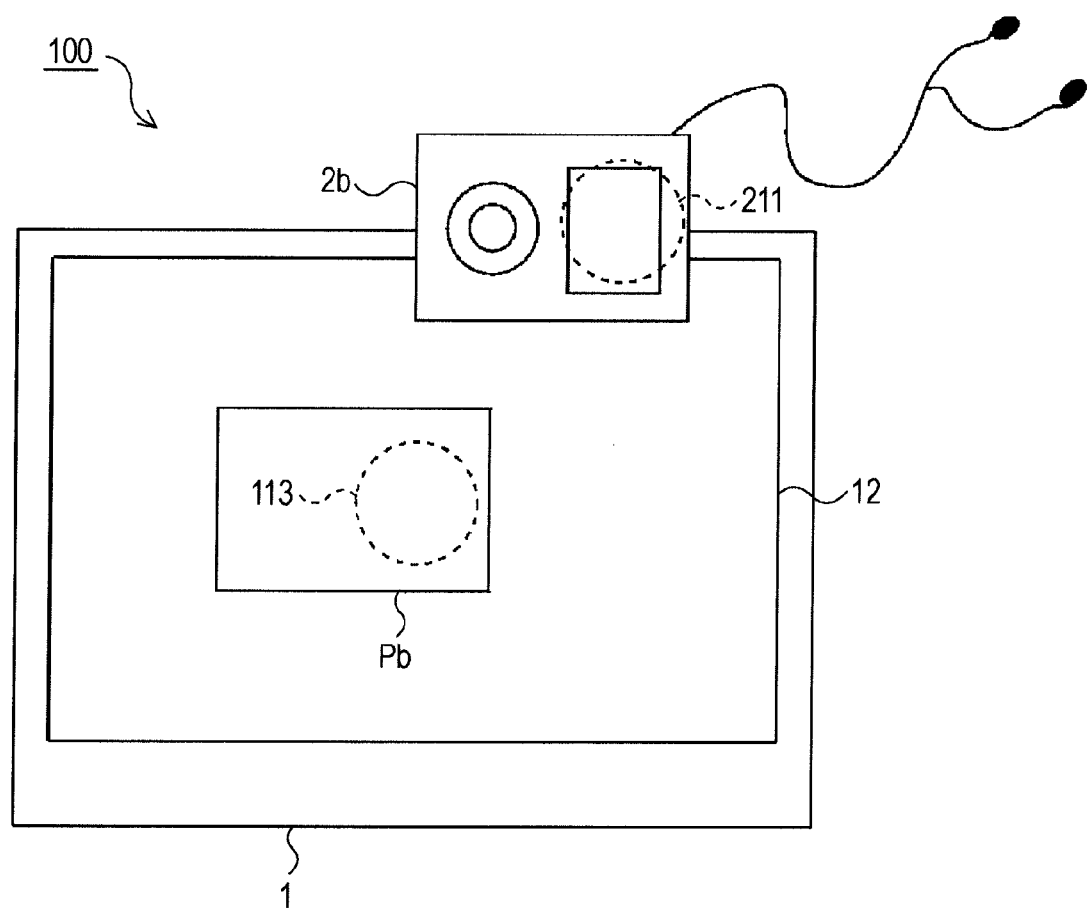
FIG. 8 is a schematic diagram showing an exemplary charging process for a music player 2b in the power supply system 100.

Next, with reference to FIG. 8, an exemplary charging process for the music player 2b performed in the power supply system 100 will be described. In the power supply system 100 as described above, when the music player 2b as shown in FIG. 8 is brought near, the outer-shape image Pb of the music player 2b is displayed in such a manner that it gradually emerges on the display function unit 12.

The music player 2b functions as a second wireless electronic device, includes the secondary coil also serving as an antenna having a predetermined directivity (hereinafter referred to as the antenna coil 211), has the terminal information D0 used for achieving matching between antennas and used for achieving matching for the antenna coil 211 with respect to the antenna coil 113 of the power supply device 1, and performs wireless communication processing. The antenna coil 211 has a circular shape and is arranged inside a casing of the music player 2b on the back side thereof. Similarly to the portable telephone 2a, the music player 2b has, for example, a 2.45 GHz-band near-field wireless communication function, such as Bluetooth (Bluetooth).

In this case too, after a beacon frame is received, matching is achieved between the antenna coil 113 and the antenna coil 211 of the music player 2b and the power supply device 1 having a wireless communication function, and wireless processing is performed. For example, after step ST1 to step ST7 shown in FIG. 7 are performed, in step ST8, the outer-shape image Pb of the music player 2b is displayed on the display function unit 12 in a layout in which the center coordinates of the circular shape of the primary coil 113, which also serves as an antenna, of the power supply device 1 match the center coordinates of the circular shape of the antenna coil 211 of the music player 2b. At this time, the display function unit 12 displays the outer-shape image Pb as an arrangement position of the music player 2b on the device mounting surface so that the display function unit 12 guides the music player 2b (specified terminal device 2) to a mounting posture with which favorable power supply processing can be executed. Thus, in a case too where the music player 2b is charged by the power supply device 1, high-efficiency power supply processing can be executed.

In this way, according to the power supply system 100 and a wireless processing method as the first embodiment, in a case where matching is to be achieved between the primary coil 113 also serving as an antenna and the antenna coil 211 also serving as an antenna between the power supply device 1 and the terminal devices 2 such as the portable telephones 2a and the music player 2b and the portable telephones 2a are to be charged by a wireless method, the power supply device 1 receives the terminal information D0 (D1+D2) from these portable telephones 2a and displays the outer-shape images Pa of the portable telephones 2a on the display function unit 12 in accordance with this terminal information D0, without prestoring the terminal information D0 regarding the portable telephones 2a.

Thus, matching can be achieved between the power supply device 1 and the terminal device 2 such as the portable telephone 2a or the music player 2b at an optimal wireless processing point. In the above-described example, when matching is to be achieved between the antennas, if the terminal device 2 such as the portable telephone 2a or the music player 2b is mounted so as to be aligned with the outer-shape image Pa displayed on the display function unit 12 of the power supply device 1, matching can automatically be achieved between the two primary coil 113 and antenna coil 211 also serving as antennas in a self-matching manner without the antenna directivity of the power supply device 1 and the antenna directivity of these terminal devices 2 being aligned via visual checking of antenna appearances.

Thus, according to the power supply system 100, regardless of shape of the terminal device 2 such as the portable telephone 2a or the music player 2b, in a state in which matching has been optimally achieved between the two primary coil 113 and antenna coil 211 also serving as antennas, a predetermined power from the power supply device 1 can favorably be used to charge (be supplied to) the portable telephone 2a, the music player 2b, or the like. Thus, there can be provided the power supply system 100 that starts a charging (feeding) process through a simple user operation in which the terminal device 2 such as the portable telephone 2a or the music player 2b is mounted on the device mounting surface of the power supply device 1.

[Second Embodiment]

Subsequent thereto, with reference to FIG. 9, an exemplary internal structure of a power supply system 200 as a second embodiment will be described. In this example, compared with the power supply system 100 according to the first embodiment, the power supply system 200 is a system in which coils do not serve as antennas and the primary and secondary coils 113 and 211 for performing charging and antennas 15 and 27 for performing communication are individually provided. The antenna 15 is provided at a predetermined position with respect to the coil-center coordinates of the primary coil 113, and the antenna 27 is provided at a predetermined position with respect to the coil-center coordinates of the secondary coil 211. As the antenna 15, the antenna 27, and the like, for example, planar antennas are used.

Figure 9:
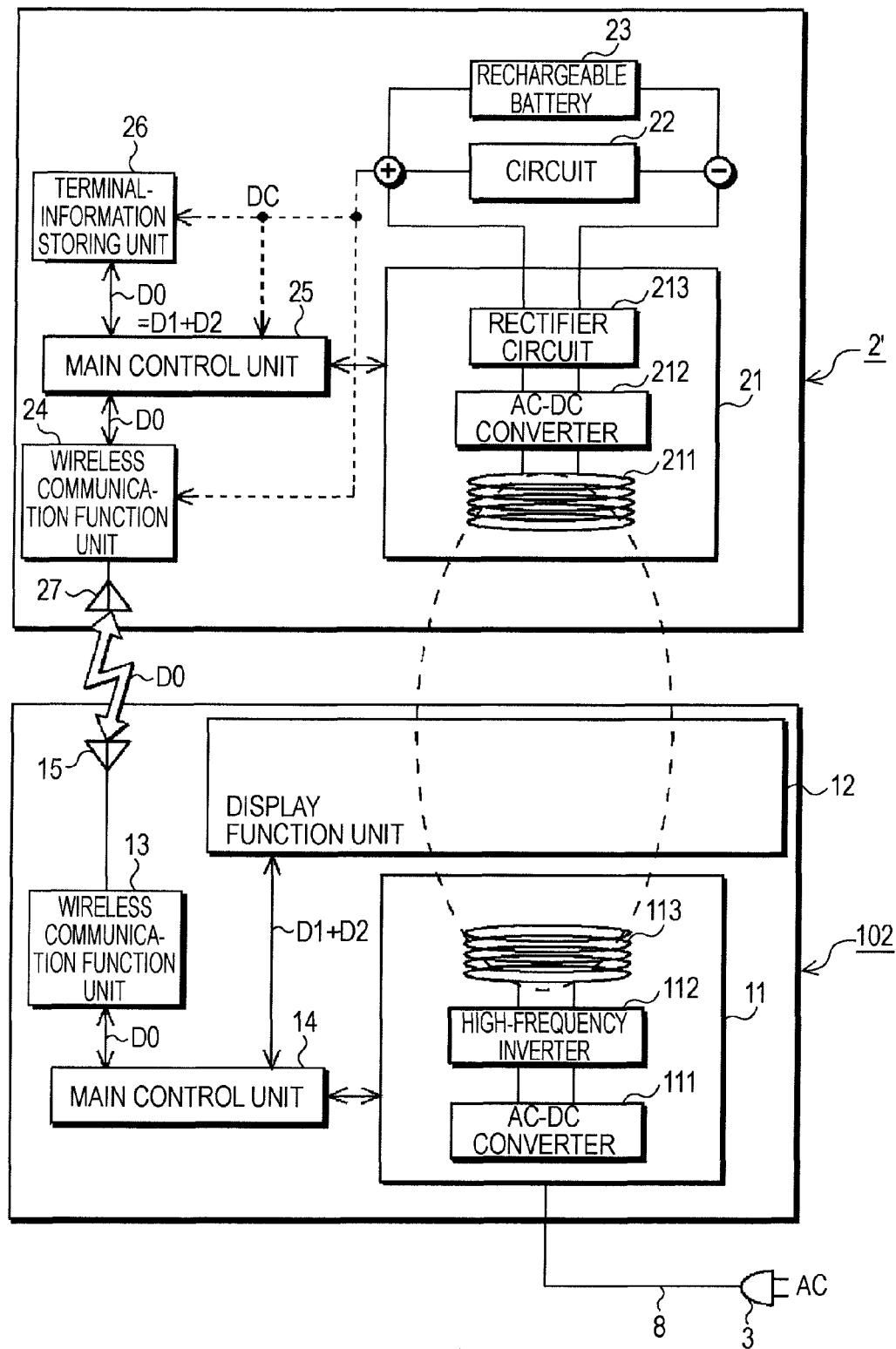
FIG. 9 is a block diagram showing an exemplary internal structure of a power supply system 200 as a second embodiment.

According to the power supply system 200 shown in FIG. 9, the power supply system 200 includes a power supply device 102. The power supply device 102 includes the antenna 15 for performing communication in addition to the primary coil 113. The antenna 15 is connected to the wireless communication function unit 13. The wireless communication function unit 13 performs wireless communication processing to and from a terminal device 2' such as the portable telephone 2a or the music player 2b mounted on the display function unit 12 provided on the device mounting surface and used when matching is to be achieved for the antenna 15 with respect to the antenna 27 of the terminal device 2'.

On the other hand, the terminal device 2' shown in FIG. 9 includes the antenna 27 for performing communication in addition to the secondary coil 211. The antenna 27 is connected to the wireless communication function unit 24. The wireless communication function unit 24 performs wireless communication processing by reading, from the terminal-information storing unit 26, the outer-shape information D1 for displaying a relationship between the outer-shape image Pa of the terminal device 2' and an directivity of the antenna 27 in the position coordinate system used when matching is to be achieved for the antenna with respect to the antenna of the power supply device 102.

In the power supply system 200, wireless communication processing is optimally performed using the antenna 15 and the antenna 27 when wireless communication is performed from the power supply device 102 to the terminal device 2'. In this example too, the power supply device 102 displays the outer-shape image Pa of the terminal device 2' such as the portable telephone 2a or the music player 2b on the display function unit 12 on the device mounting surface in accordance with the terminal information D0. Then, a user mounts the terminal device 2' on the device mounting surface. At this time, when the terminal device 2' is charged by the power supply device 102, as described in the first embodiment, matching is achieved so as to be in a state in which the primary coil 113 and the secondary coil 211 are optimally aligned. In this state, for example, the power supply device 102 supplies power to the portable telephone 2a in a noncontact manner or executes desired communication processing between the power supply device 102 and these terminal devices 2'.

Next, exemplary charge communication performed in the power supply system 200 will be described with reference to FIG. 10. According to exemplary charging shown in FIG. 10, an exemplary sequence of charge communication is described in which after a sequence of step ST1 to step ST7 shown in FIG. 7 is performed, the outer-shape image Pa or Pb of the terminal device 2' such as the portable telephone 2a or the music player 2b is displayed in step ST8, charging (sending of power) is started in step ST9, and thereafter the antenna 15 and the antenna 27 are further utilized and the procedure proceeds from step ST10 to step ST23 until charging is completed.

In this example, a case is described in which a user is notified of charge progress by changing the displayed color of the outer-shape image Pa of the terminal device 2' such as the portable telephone 2a, and displaying of the outer-shape image Pa is terminated or the displayed color thereof is changed when charging is completed. In the power supply system 200 shown in FIG. 10, after the above-described predetermined sequence is performed, the outer-shape image Pa of the terminal device 2' such as the portable telephone 2a is displayed in step ST8. In step ST9, charging (sending of power) is started. In step ST10, the portable telephone 2a is being charged.

Then, charge progress in the terminal device 2' such as the portable telephone 2a is detected at the power receiving function unit 21 in step ST11. A known technology can be applied to a method for detecting charge progress. In this example, charge characteristics as shown in FIG. 6 are given to the rechargeable battery 23 in the terminal device 2'. A charge percent is detected by measuring a current and a voltage for the rechargeable battery 23 and comparing them with these characteristics.

In this example, the terminal device 2' such as the portable telephone 2a detects its charge percent at regular time intervals in step ST11, step ST14, and the like. In step ST12, step ST15, . . . , step ST18, and the like, the terminal device 2' adds a charge-percent parameter to a charge-progress notification frame F7 and sends the charge-progress notification frame F7 to the power supply device 102. The power supply device 102 obtains the charge-percent parameter from the received charge-progress notification frame F7 and changes displaying of the outer-shape image Pa of the portable telephone 2a in accordance with a color corresponding to a charge value in step ST13, step ST16, and the like. For example, the beginning of charging is represented by red. Subsequent thereto, as the charging time elapses, the color changes to yellow. Thereafter, when charging is completed, the color changes to blue (green). As a matter of course, colors are not limited thereto.

Moreover, in a case where a charge-percent parameter indicates full charge in step ST17, in step ST18, the charge-progress notification frame F7 to which completion of charging is added is sent. The power supply device 102 that has received the charge-progress notification frame F7 indicating completion of charging stops sending power in step ST19 on the assumption that charging of the portable telephone 2a has been complete, and terminates displaying of the outer-shape image Pa in step ST20. Here, in step ST13, step ST16, and step ST20, the gradation of a displayed color may be changed from dark to light on the display function unit 12 in response to charge progress and finally displaying may be terminated in response to full charge.

Thereafter, as processing for completing charging, in step ST21, the power supply device 102 sends a disconnection request frame F8 to the portable telephone 2a. The portable telephone 2a that has received the disconnection request frame F8 sends a disconnection response frame F9 to the power supply device 102 in step ST22. In the power supply device 102, wireless communication processing is completed and the charge sequence is also completed in step ST23.

In this way, according to the power supply system 200 and a wireless processing method as the second embodiment, even in a system in which the primary and secondary coils 113 and 211 for performing charging and the antennas 15 and 27 for performing communication are individually provided, similarly to the first embodiment, the power supply device 102 can execute displaying of the outer-shape image Pa, Pb, or the like corresponding to the terminal device 2' such as the portable telephone 2a or the music player 2b by performing communication using the unique terminal information D0 from the terminal devices 2' to the power supply device 102.

Figure 10:
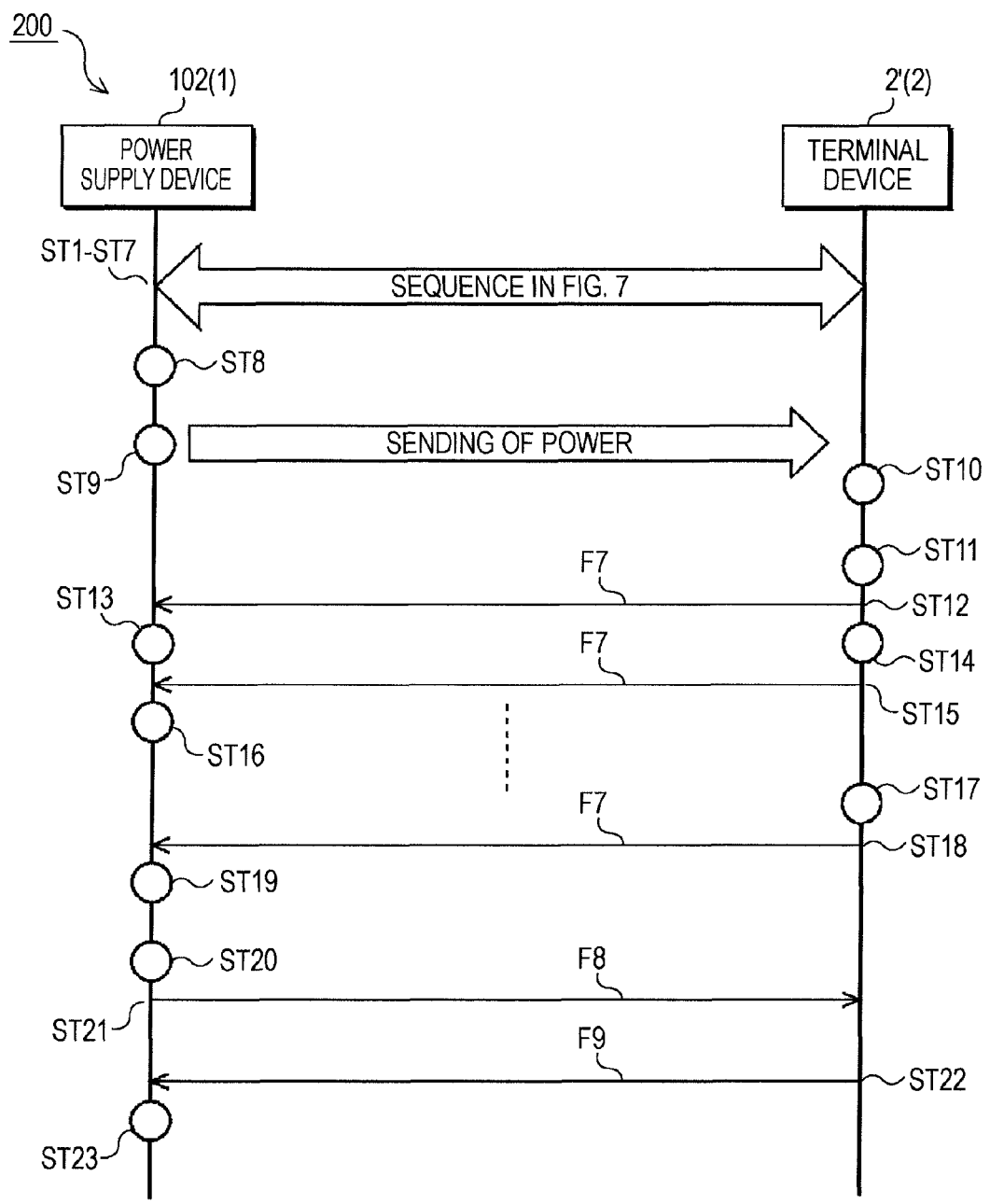
FIG. 10 is a sequence chart showing exemplary charge communication performed in the power supply system 200.

Thus, in a state in which matching has been optimally achieved between the two primary coil 113 and secondary coil 211, a predetermined power can be supplied from the power supply device 102 to the terminal device 2' such as the portable telephone 2a or the music player 2b, and desired communication processing can be executed between the power supply device 102 and these terminal devices 2' as shown in FIG. 10. Furthermore, the displayed color of the outer-shape image Pa of the terminal device 2' such as the portable telephone 2a can be changed in response to a charge state or displaying of the outer-shape image Pa can be terminated, whereby a user can be easily and simply notified of a charge-progress state or a charge-completion state.

[Third Embodiment]

Subsequent thereto, with reference to FIG. 11, an exemplary internal structure of a power supply system 300 as a third embodiment will be described. In this embodiment, a power supply device 103 has the terminal information D0 regarding the terminal device 2 such as the portable telephone 2a or the music player 2b in advance. The power supply device 103 receives identification information D3 (unique terminal information D0) from the portable telephone 2a at the wireless communication function unit 13, and displays the outer-shape image Pa corresponding to the portable telephone 2a in accordance with the identification information D3 received from this portable telephone 2a (second wireless processing system).

Figure 11:
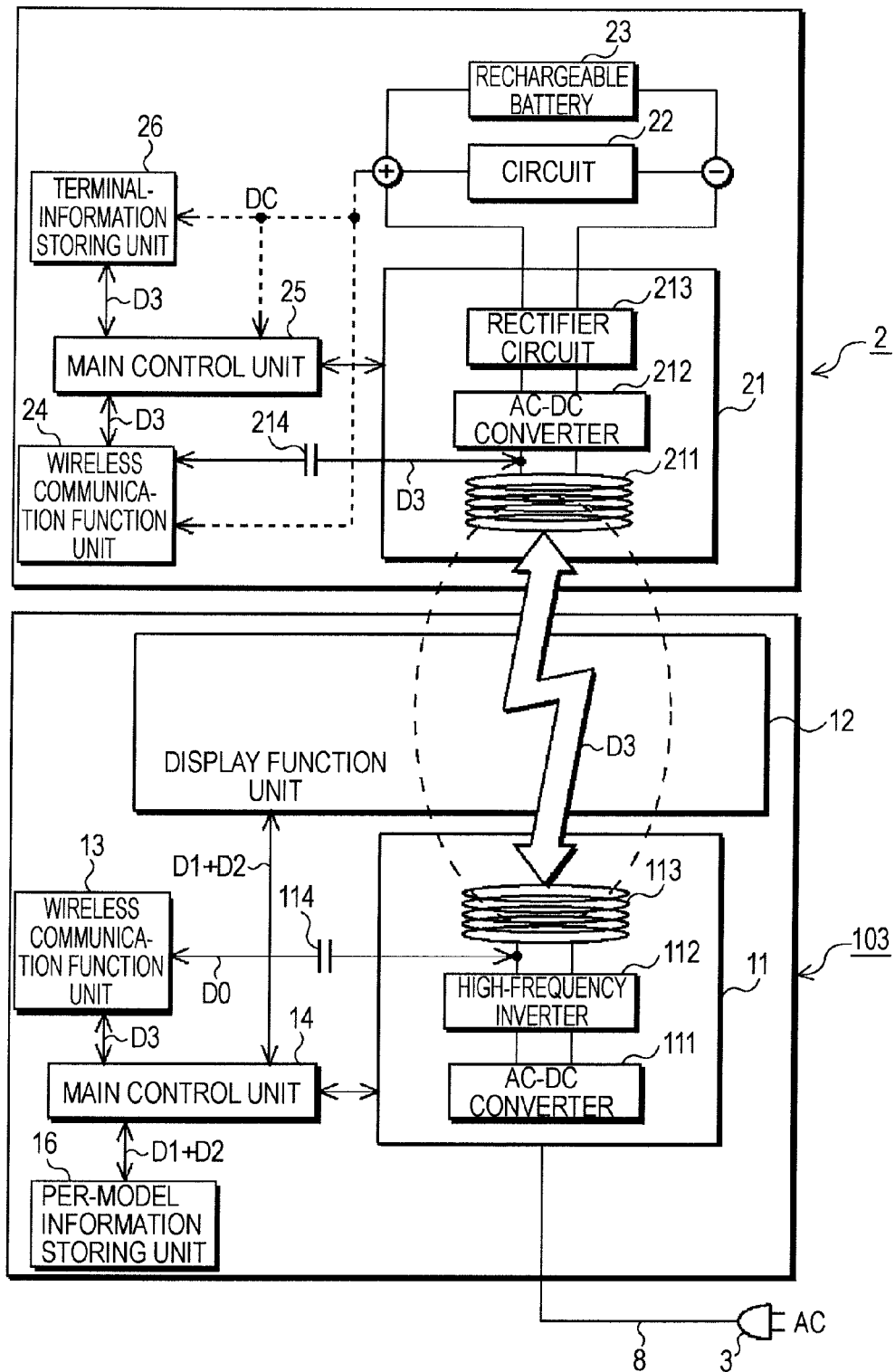
FIG. 11 is a block diagram showing an exemplary internal structure of a power supply system 300 as a third embodiment.

According to the power supply system 300 shown in FIG. 11, the power supply device 103 functioning as a third wireless electronic device includes a per-model information storing unit 16. The per-model information storing unit 16 functions as a storage unit, is connected to the main control unit 14, and stores the outer-shape information D1 and coordinate information D2 of the terminal device 2 such as the portable telephone 2a or the music player 2b corresponding to the identification information D3. The identification information D3 is one example of the unique terminal information D0 and is information used to identify the model of the portable telephone 2a, the music player 2b, or the like.

The power supply device 103 obtains the identification information D3 from the portable telephone 2a, reads the outer-shape information D1 and coordinate information D2 of the portable telephone 2a from the per-model information storing unit 16 in accordance with this identification information D3, and displays the outer-shape image Pa of the portable telephone 2a on the display function unit 12 on the device mounting surface.

As a result of this display being performed, in the third embodiment too, similarly to the first and second embodiments, the power supply device 103 can automatically display the outer-shape image Pa of the portable telephone 2a through an operation in which a user brings the portable telephone 2a near to the power supply device 103. A user can perform a noncontact charging (feeding) process having high power efficiency for various terminal devices 2 such as the portable telephone 2a through a simple operation. Here, in FIG. 11, components having the same reference numerals as those in the power supply system 100 in the first embodiment shown in FIG. 3 have the same function, whereby description thereof will be omitted.

Next, with reference to FIG. 12, an exemplary charging process performed in the power supply system 300 will be described. A sequence chart shown in FIG. 12 shows a frame sequence in wireless communication processing performed between the power supply device 103 and the terminal device 2 such as the portable telephone 2a.

In this example, a case is assumed in which a wireless charging process is performed between the power supply device 103 that includes the per-model information storing unit 16, the antenna coil 113 having a predetermined directivity, and the display function unit 12 on the device mounting surface and performs wireless communication processing and the terminal device 2 that includes the antenna coil 211 having a predetermined directivity, has the terminal information D0 used for achieving matching between the antennas and used for achieving matching for the antenna coil 211 with respect to the antenna coil 113, and performs wireless communication processing in accordance with the identification information D3. A case in which, when matching is to be achieved between the antennas, the portable telephone 2a sends the terminal information D0 and the identification information D3 to the power supply device 103 and the power supply device 103 receives the terminal information D0=D3 from the portable telephone 2a and displays the outer-shape image Pa of the portable telephone 2a on the display function unit 12 in accordance with the identification information D3 will be described as an example.

Figure 12:
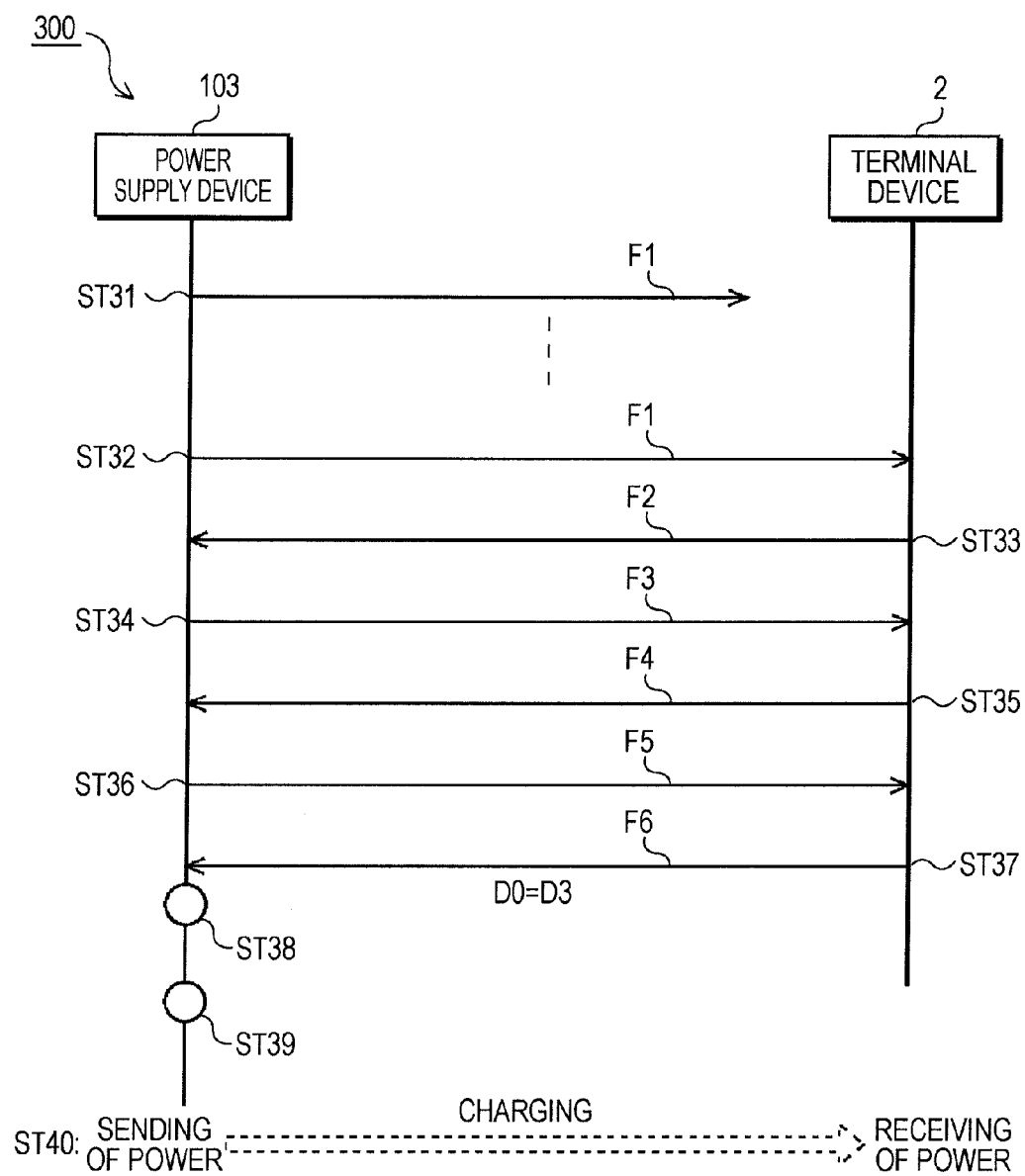
FIG. 12 is a sequence chart showing an exemplary charging process performed in the power supply system 300.

In step ST31 shown in FIG. 12, similarly to the first embodiment, the power supply device 103 transmits the beacon frame F1 at regular time intervals. Then, if a user brings the portable telephone 2a or the like near to the power supply device 103, in step ST32, the portable telephone 2a receives the transmitted beacon frame F1. In response to this beacon frame F1, in step ST33, the portable telephone 2a sends the terminal notification frame F2 to the power supply device 103. The power supply device 103 receives the terminal notification frame F2 from the portable telephone 2a, and sends the connection request frame F3 to the portable telephone 2a in step ST34. Thereafter, the portable telephone 2a receives the connection request frame F3, and sends the connection response frame F4 to the power supply device 103 in step ST35.

The power supply device 103 receives the connection response frame F4 from the portable telephone 2a, and sends the terminal-information request frame F5 to the portable telephone 2a in step ST36. Thereafter, the portable telephone 2a receives the terminal-information request frame F5, and sends the terminal-information response frame F6 to the power supply device 103 in step ST37. At this time, in the portable telephone 2a, the identification information D3 is read from the terminal-information storing unit 26, the terminal information D0=the identification information D3 is written into (added to) the terminal-information response frame F6, and the terminal-information response frame F6 is sent to the power supply device 103.

Next, the power supply device 103 receives the terminal-information response frame F6 from the portable telephone 2a, and executes terminal-model determination processing in step ST38. According to this processing, the terminal information D0=the identification information D3 is extracted from the terminal-information response frame F5. The main control unit 14 of the power supply device 103 uses the identification information D3 as, for example, an address, and reads corresponding outer-shape information D1 and coordinate information D2 from the per-model information storing unit 16. Thus, the model of the terminal device 2 such as the portable telephone 2a or the music player 2b is determined.

Then, in step ST39, the outer-shape image Pa of the portable telephone 2a is displayed on the display function unit 12. In this example too, similarly to the first and second embodiments, the bitmap information regarding the portable telephone 2a shown in FIG. 4B is allocated to the display area I shown in FIG. 4A on the display function unit 12 of the power supply device 103, and the outer-shape image Pa of the portable telephone 2a as shown in FIG. 5 is displayed. At this time, the power supply device 103 causes the coordinate information D2 that indicates the power supply point for the portable telephone 2a to match the coordinate information D2 that indicates the power supply point of the power supply device 103 and displays the outer-shape image Pa.

In the above-described frame sequence, everything is automatically performed similarly to the first and second embodiments. The user operation in which the terminal device 2 such as the portable telephone 2a is brought near to the power supply device 103 causes the power supply device 103 to halt after displaying of the outer shape of the portable telephone 2a. Then, a user who handles the portable telephone 2a mounts the portable telephone 2a so as to be aligned with the outer-shape image Pa displayed on the display function unit 12 of the power supply device 103 similarly to the first embodiment. Thereafter, in step ST40, a wireless charging process is performed from the power supply device 103 to the portable telephone 2a. The power supply device 103 sends power, and the portable telephone 2a receives the power. In this example, in step ST38, the model of the terminal is determined, and thus charge communication processing as shown in FIG. 10 can be executed.

In this way, according to the power supply system 300 as the third embodiment, in a case where matching is to be achieved between the antenna coils 113 and 211 of the terminal device 2 such as the portable telephone 2a and the power supply device 103 and a wireless charging process is to be performed, the identification information D3 is stored in the terminal device 2. The identification information D3 is information used to read the outer-shape information D1+coordinate information D2 for displaying a relationship between the outer-shape image Pa or the like and the antenna directivity of the terminal device 2 in the position coordinate system used when matching is to be achieved for the antenna with respect to the antenna of the power supply device 103. With this assumption, if the power supply device 103 receives the identification information D3 from the terminal device 2 such as the portable telephone 2a, the power supply device 103 reads the outer-shape information D1+the coordinate information D2 of the portable telephone 2a from the per-model information storing unit 16 in which a plurality of items of the outer-shape information D1 and the like are stored on a per-model basis. The outer-shape image Pa of the portable telephone 2a is displayed on the display function unit 12 in accordance with this outer-shape information D1+the coordinate information D2.

Thus, similarly to the first and second embodiments, if the terminal device 2 is mounted so as to be aligned with the outer-shape image Pa displayed on the display function unit 12 of the power supply device 103, matching can automatically be achieved between the two antenna coils 113 and 211 in a self-matching manner without the antenna directivity of the power supply device 103 (antenna coil 113) and the antenna directivity of the terminal device 2 (antenna coil 211) being aligned via visual checking of their appearances. Thus, in a state in which matching has been optimally achieved between the two antenna coils 113 and 211, a predetermined power can be supplied from the power supply device 103 to the terminal device 2 and desired communication processing can be executed between the power supply device 103 and the terminal device 2.

[Fourth Embodiment]

Subsequent thereto, with reference to FIG. 13, an exemplary internal structure of a power supply system 400 as a fourth embodiment will be described. In this example, compared with the power supply systems 100 and 300 according to the first and third embodiments, the power supply system 400 is a system in which coils do not serve as antennas and the primary and secondary coils 113 and 211 for performing charging and the antennas 15 and 27 for performing communication are individually provided. Similarly to the second embodiment, the antenna coil 113 is provided at a predetermined position with respect to the coil-center coordinates of the primary coil 113, and the antenna coil 211 is provided at a predetermined position with respect to the coil-center coordinates of the secondary coil 211.

Figure 13:
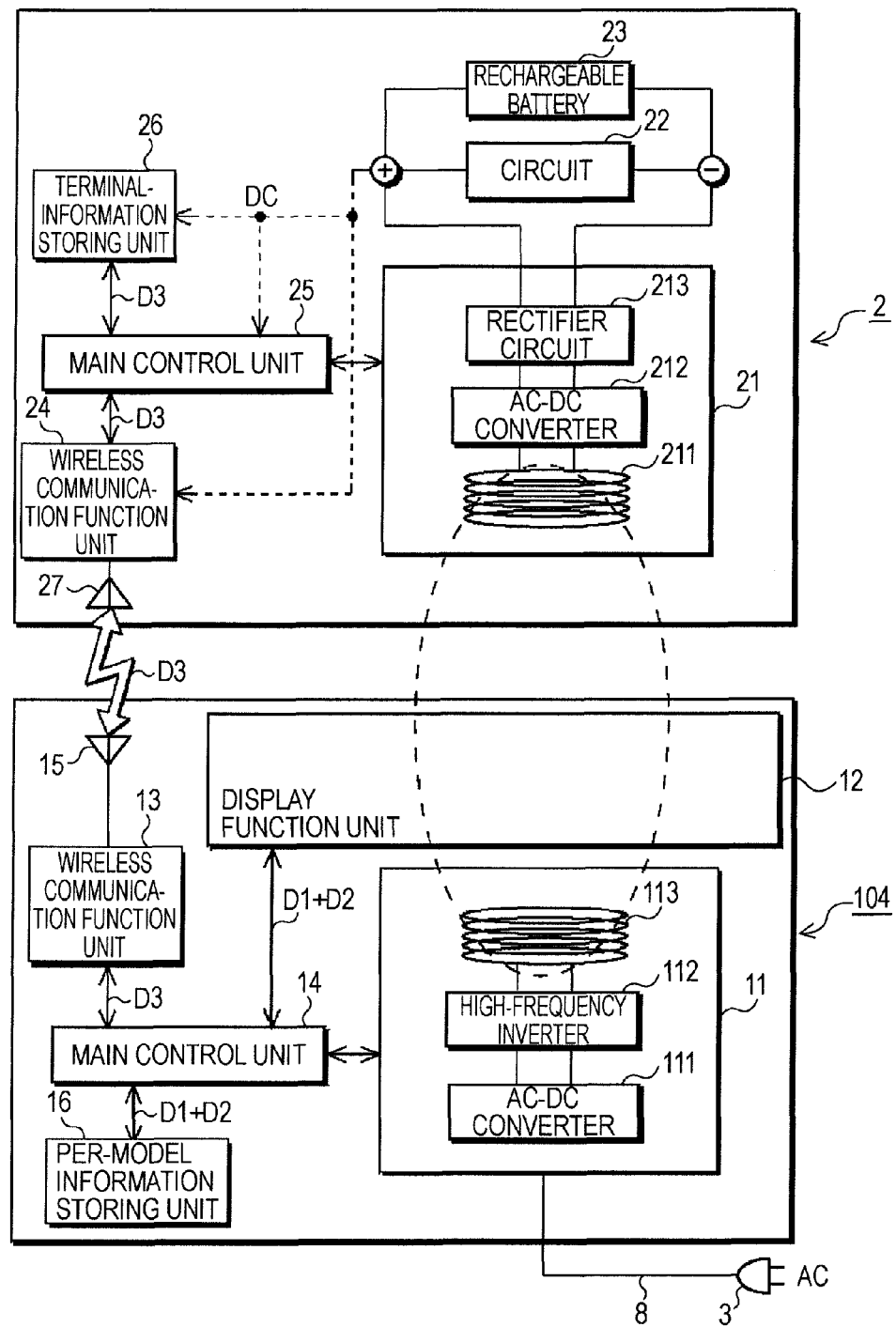
FIG. 13 is a block diagram showing an exemplary internal structure of a power supply system 400 as a fourth embodiment.

According to the power supply system 400 shown in FIG. 13, the power supply system 400 includes a power supply device 104 functioning as a fourth wireless electronic device. The power supply device 104 includes the antenna 15 for performing communication in addition to the primary coil 113, similarly to the second embodiment. The antenna 15 is connected to the wireless communication function unit 13. The wireless communication function unit 13 performs wireless communication processing in accordance with the identification information D3 to and from the terminal device 2 such as the portable telephone 2a or the music player 2b mounted on the display function unit 12 provided on the device mounting surface and used when matching is to be achieved for the antenna 15 with respect to the antenna 27 of the terminal device 2. The identification information D3 is information used to read the outer-shape information D1+coordinate information D2 for displaying a relationship between the outer-shape image Pa or the like and the antenna directivity of the terminal device 2 in the position coordinate system used when matching is to be achieved for the antenna with respect to the antenna of the power supply device 104.

On the other hand, the terminal device 2 shown in FIG. 13 includes the antenna 27 for performing communication in addition to the secondary coil 211. The antenna 27 is connected to the wireless communication function unit 24. The wireless communication function unit 24 performs wireless communication processing by reading the identification information D3 from the terminal-information storing unit 26. The identification information D3 is information used to read the outer-shape information D1 for displaying a relationship between the outer-shape image Pa and the directivity of the antenna 27 of the terminal device 2 in the position coordinate system used when matching is to be achieved for the antenna with respect to the antenna of the power supply device 104.

In the power supply device 104, the main control unit 14 reads the outer-shape information D1+the coordinate information D2 on a per-model basis from the per-model information storing unit 16 using the identification information D3 received from the portable telephone 2a. Here, in FIG. 13, components having the same reference numerals as those in the power supply system 200 in the second embodiment shown in FIG. 9 have the same function, whereby description thereof will be omitted.

In this example too, for the portable telephone 2a of different model or the like, the outer-shape image Pa of the portable telephone 2a can be displayed on the display function unit 12 on the device mounting surface. Moreover, the portable telephone 2a or the like is mounted so as to be aligned with the outer-shape images Pa displayed on the display function unit 12 of the power supply device 104.

In the power supply system 400, when wireless communication is performed from the power supply device 104 to the terminal device 2, wireless communication processing is optimally performed using the antenna 15 and the antenna 27. In this example, the power supply device 104 displays the outer-shape image Pa, Pb, or the like of the terminal device 2 such as the portable telephone 2a or the music player 2b on the display function unit 12 on the device mounting surface in accordance with the outer-shape information D1+the coordinate information D2. Then, a user mounts the terminal device 2 on the device mounting surface. At this time, when charging is performed from the power supply device 104 to the terminal device 2, as described in the first to the third embodiments, matching is achieved so as to be in a state in which the primary coil 113 and the secondary coil 211 are optimally aligned. In this state, for example, the power supply device 104 supplies power to the portable telephones 2a in a noncontact manner or executes desired communication processing between the power supply device 104 and these terminal devices 2.

In this way, according to the power supply system 400 and a wireless processing method as the fourth embodiment, the identification information D3 is stored in the portable telephone 2a in a system in which the primary and secondary coils 113 and 211 for performing charging and the antennas 15 and 27 for performing communication are individually provided. If the power supply device 104 receives the identification information D3 from the terminal device 2 such as the portable telephone 2a, the power supply device 104 reads the outer-shape information D1+the coordinate information D2 of the portable telephone 2a from the per-model information storing unit 16 in which a plurality of items of the outer-shape information D1 and the like are stored on a per-model basis. The outer-shape image Pa of the portable telephone 2a is displayed on the display function unit 12 in accordance with this outer-shape information D1+the coordinate information D2.

Thus, similarly to the power supply systems 100, 200, and 300 in the first to the third embodiments, if the portable telephone 2a is mounted so as to be aligned with the outer-shape image Pa displayed on the display function unit 12 of the power supply device 104, matching can automatically be achieved between the two antenna coils 113 and 211 in a self-matching manner without the primary coil 113 (antenna directivity) of the power supply device 104 and the secondary coil (antenna directivity) of the portable telephone 2a being aligned via visual checking of antenna coil appearances. Thus, in a state in which matching has been optimally achieved between the two antenna coils 113 and 211 and between the antennas 15 and 27, a predetermined power is supplied form the power supply device 104 to the portable telephone 2a or desired communication processing can be executed between the power supply device 104 and the terminal device 2 such as the portable telephone 2a or the music player 2b.

[Fifth Embodiment]

Subsequent thereto, with reference to FIG. 14, an exemplary structure of a data communication system 500 as a fifth embodiment will be described. In this embodiment, matching is achieved between antenna directivities of a data communication device 105 and a portable telephone 2c in accordance with an outer-shape image Pc and the like, and desired communication processing can be executed (third wireless processing system).

Figure 14:
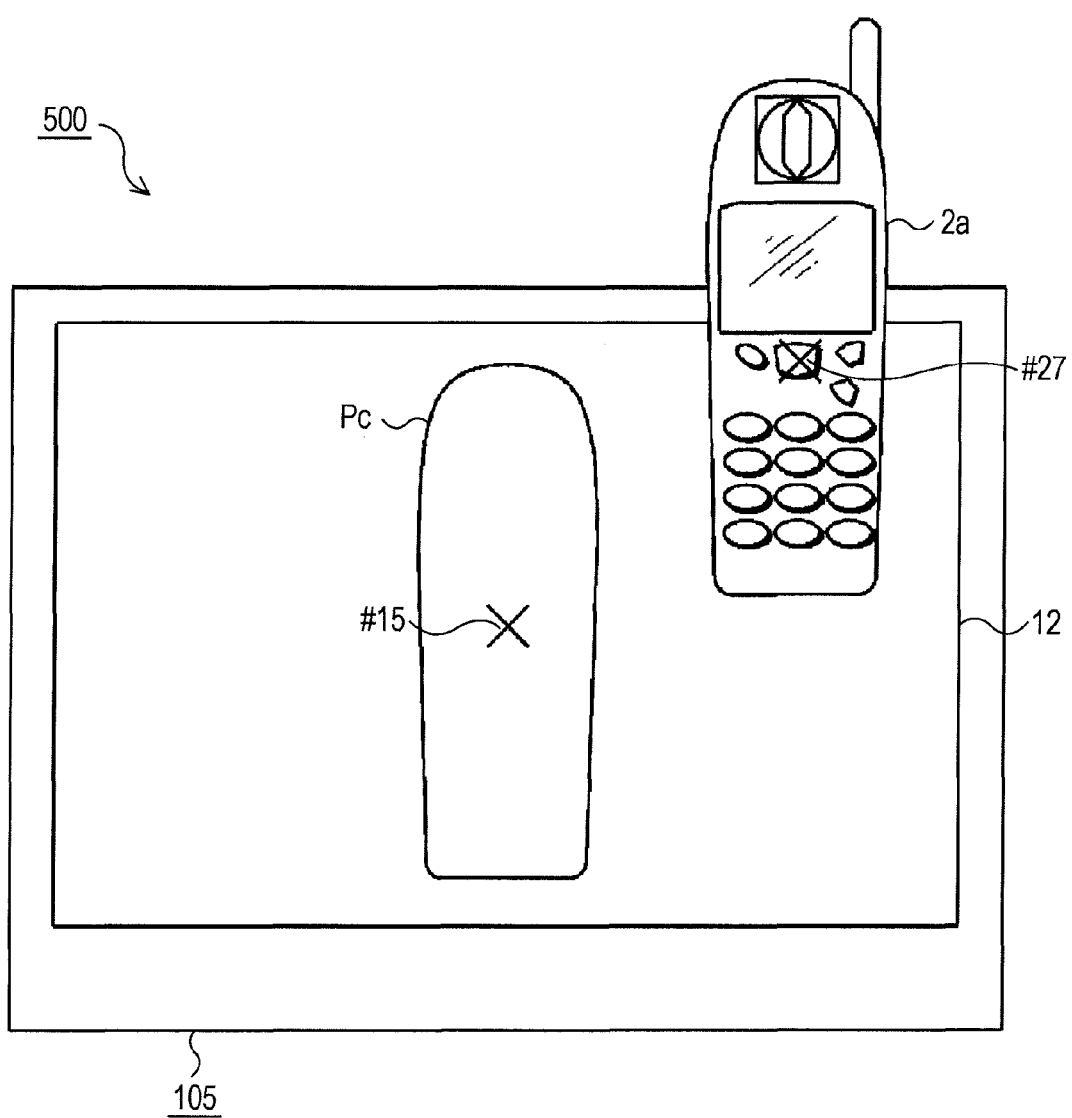
FIG. 14 is a diagram showing an exemplary structure of a data communication system 500 as a fifth embodiment.

The data communication system 500 shown in FIG. 14 functions as a wireless processing system, and is a system that achieves matching between antennas of two wireless electronic devices such as the data communication device 105 having a near-field wireless communication function and a terminal device 201 having the same function and performs data communication processing in a noncontact manner. The data communication device 105 functions as a first wireless electronic device. The data communication device 105 has a casing having a predetermined shape and includes the antenna 15 having a predetermined directivity within the casing, and performs wireless communication processing. The display function unit 12 is provided on the top surface of the casing. In this example, the top surface of the display function unit 12 is the device mounting surface.

The antenna 15 has, for example, a circular shape, and is fixed on the back side of the display function unit 12. The antenna 15 has, for example, a directivity #15 that maximizes antenna sensitivity to a wireless electronic device with which communication is to be performed, at the time of sending/receiving. As the data communication device 105, a noncontact data communication appliance having a near-field wireless communication function that performs data communication when the terminal device 201 such as the portable telephone 2c or a music player 2d is placed on the device mounting surface is used.

The terminal device 201 functions as a second wireless electronic device, includes the antenna 27 having a predetermined directivity, has terminal information D0' used for achieving matching between the antennas and used for achieving matching for the antenna 27 with respect to the antenna 15 of the data communication device 105, and performs wireless communication processing. The antenna 27 also has a circular shape, and is arranged inside a casing of the portable telephone 2c on the back side thereof. The antenna 27 also has, for example, a directivity #27 that maximizes antenna sensitivity to a wireless electronic device with which communication is to be performed at the time of sending/receiving. As the portable telephone 2c, the music player 2d, or the like serving as the terminal device 201, a device having, for example, a 2.45 GHz-band near-field wireless communication function, such as Bluetooth (Bluetooth), is used.

In this example, when a user brings these terminal devices 201 near to the data communication device 105, for example, the outer-shape image Pc of the portable telephone 2c is displayed in such a manner that it gradually emerges on the display function unit 12. At this time, the outer-shape image Pc is displayed on the display function unit 12 in a layout in which the center coordinates of the circular shape of the antenna 15 of the data communication device 105 match the center coordinates of the antenna 27 of the portable telephone 2c and that enables high-efficiency data communication.

Next, with reference to FIG. 15, exemplary internal structures of the data communication device 105 and terminal device 201 in the data communication system 500 will be described. In this example, an exemplary structure of the data communication device 105 and an exemplary structure of the terminal device 201 are separately described. The data communication device 105 shown in FIG. 15 has a near-field wireless communication function. Furthermore, the data communication device 105 has a function of receiving the terminal information D0' from the terminal device 201, and displaying the outer-shape image Pc of the portable telephone 2c, the music player 2d, or the like in accordance with this terminal information D0'.

The data communication device 105 includes, for example, the display function unit 12, the wireless communication function unit 13, the main control unit 14, and the antenna 15. In this example, the wireless communication function unit 13 is connected to the antenna 15 and performs wireless communication processing to and from the terminal device 201 such as the portable telephone 2c or the music player 2d that is brought near to the device mounting surface and mounted on the device mounting surface. For example, the wireless communication function unit 13 transmits the beacon frame F1 at regular time intervals, and receives the outer-shape information D1 by receiving the terminal notification frame F2 from the portable telephone 2c that has been brought near to the device mounting surface (see FIG. 18).

The wireless communication function unit 13 is provided with a 2.45 GHz-band near-field wireless communication function, such as Bluetooth. In other words, a data communication method that is applied to near-field wireless communication such as, for example, RFID and that has a function for performing wireless communication processing to and from the portable telephone 2c or the like needs to be provided. The main control unit 14 is connected to the wireless communication function unit 13, and controls input/output of the display function unit 12 and the wireless communication function unit 13 in a centralized manner. For example, the main control unit 14 receives the outer-shape information D1 and coordinate information D2' that the wireless communication function unit 13 received from the portable telephone 2c, outputs the outer-shape information D1 and coordinate information D2' to the display function unit 12, and performs control in such a manner that the outer-shape image Pc of the portable telephone 2c is displayed on the device mounting surface. The main control unit 14 is constituted by a CPU (central processing unit), a ROM (read-only memory), a RAM (memory into and from which information can be randomly written and read), and the like.

The display function unit 12 is connected to the main control unit 14 and has a function of displaying the outer-shape image Pc of the terminal device 201 such as the portable telephone 2c or the music player 2d on the device mounting surface. In this example, before the portable telephone 2c or the like is mounted on the device mounting surface, the display function unit 12 obtains the outer-shape information D1 and displays the outer-shape image Pc of the portable telephone 2c or the like based on this. That is, the outer-shape image Pc is displayed on the display function unit 12 on the device mounting surface before the portable telephone 2c, the music player 2d, or the like is mounted on the device mounting surface. This is performed so as to show a user a way of mounting the portable telephone 2c, the music player 2d, or the like. As the display function unit 12, for example, a liquid crystal display device, or a display device capable of displaying by projection is used.

When the data communication device 105 is configured in this way, in a case where matching is to be achieved between the antennas 15 and 27 of the data communication device 105 and the portable telephone 2c and data communication processing is to be performed, the wireless communication function unit 13 receives the outer-shape information D1 from the portable telephone 2c. The display function unit 12 displays the outer-shape image Pc of the portable telephone 2c in accordance with the outer-shape information D1. For example, the outer-shape image Pc showing a data communication point is displayed on the display function unit 12 on the device mounting surface of the data communication device 105. Thus, if the portable telephone 2c is mounted so as to be aligned with the outer-shape image Pc displayed on the display function unit 12, matching can automatically be achieved between the two antennas 15 and 27 in a self-matching manner, without the directivity of the antenna 15 of the data communication device 105 and the directivity of the antenna 27 of the portable telephone 2c being aligned via visual checking of antenna appearances.

The terminal device 201 to which data communication processing is performed by the data communication device 105 is a wireless electronic device such as the portable telephone 2c or the music player 2d and can be applied in the data communication system 500. The terminal device 201 has the terminal information D0'. Here, the terminal information D0' is information managed by the terminal device 201. The terminal information D0' includes the outer-shape information D1 and the coordinate information D2'. Here, the outer-shape information D1 is information for displaying a relationship between the outer-shape image Pc and the antenna directivity #27 of the portable telephone 2c (subject device) in a position coordinate system used when matching is to be achieved between the antennas through the display function unit 12 of the data communication device 105. The coordinate information D2' is information that informs the data communication device 105 of an optimal data communication point.

Figure 15:
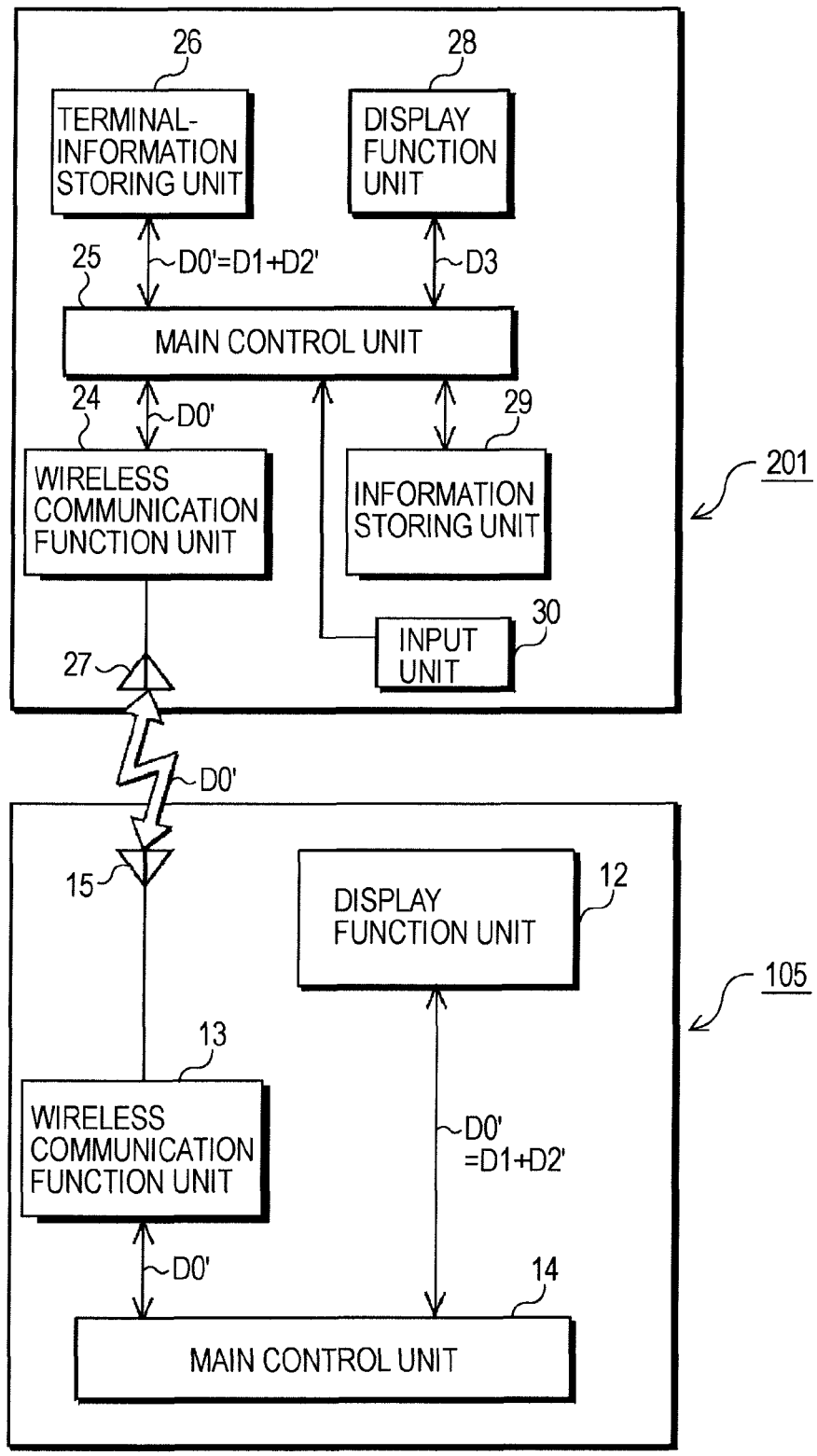
FIG. 15 is a block diagram showing exemplary internal structures of a data communication device 105 and a terminal device 201 in the data communication system 500.

The terminal device 201 includes, for example, the wireless communication function unit 24, the main control unit 25, the terminal-information storing unit 26, a display function unit 28, an information storing unit 29, and an input unit 30 as shown in FIG. 15. The wireless communication function unit 24 is connected to the antenna 27 and performs wireless communication processing to and from the data communication device 105. For example, the wireless communication function unit 24 sends the outer-shape information D1 read from the terminal-information storing unit 26 to the data communication device 105 when matching is to be achieved between the antennas. Similarly to the wireless communication function unit 13, the wireless communication function unit 24 is provided with a 2.45 GHz-band near-field wireless communication function or a data communication method that is applied to near-field wireless communication such as RFID.

The main control unit 25 is connected to the wireless communication function unit 24, and controls input/output of the wireless communication function unit 24, the terminal-information storing unit 26, the display function unit 28, the information storing unit 29, and the input unit 30. Similarly to the main control unit 14, the main control unit 25 is constituted by a CPU (central processing unit), a ROM (read-only memory), a RAM (memory into and from which information can be randomly written and read), and the like, and controls, for example, part of the terminal device 201 or the entire terminal device 201.

The terminal-information storing unit 26 functioning as a storage unit is connected to the main control unit 25, and stores the terminal information D0' unique to a terminal device such as the portable telephone 2c or the music player 2d. The terminal information D0' is the outer-shape information D1+the coordinate information D2'. In the terminal-information storing unit 26, for example, the coordinate information D2' that indicates a predetermined data communication point. Here, in addition to the terminal information D0', telephone-number information, user information, and the like are stored.

As the terminal-information storing unit 26, a nonvolatile memory such as an EEPROM (electrically information erasable programmable ROM) or a fixed storage disk device (hard disk: HDD) is used. Nonvolatile memories are memories into which data can be written as necessary and that hold data even when the power is turned off. The outer-shape information D1 and the coordinate information D2' are used to display the outer-shape image Pc of the portable telephone 2c or the like. The terminal information D0' is expressed using, for example, bitmap information.

The display function unit 28, the information storing unit 29, and the input unit 30 are connected to the main control unit 25 and are used when data communication processing is performed. For example, an image showing that data communication processing is being performed, a title image, and the like are displayed on the display function unit 28. Data sent from the data communication device 105 (downloaded information) is stored in the information storing unit 29. Moreover, in a case where the terminal device 201 is a digital camera or the like, still-image information is stored (accumulated) in the information storing unit 29, and when data communication is performed, accumulated still-image information (information to be uploaded) is transferred from the terminal device 201 to the data communication device 105. As the information storing unit 29, similarly to the terminal-information storing unit 26, a nonvolatile memory such as an EEPROM, an HDD, or the like is used. As a matter of course, the information storing unit 29 and the terminal-information storing unit 26 may be provided as one unit. When such data communication processing is performed, the input unit 30 is operated in a case where a transfer start input is commanded, the still-image information accumulated in the information storing unit 29 is checked, or the like.

If the terminal device 201 is configured like this, in a case where matching is to be achieved between the two antennas 15 and 27 and wireless data communication processing is to be performed, the wireless communication function unit 24 sends the outer-shape information D1 to the data communication device 105 when matching is to be achieved between the antennas. Thus, if the portable telephone 2c or the like is mounted so as to be aligned with the outer-shape image Pc displayed on the display function unit 12 of the data communication device 105, matching can automatically be achieved between the two antennas 15 and 27 in a self-matching manner, without the antenna directivity #15 of the data communication device 105 and the antenna directivity #27 of the terminal device 201 being aligned via visual checking of antenna appearances. Thus, high-efficiency data communication processing can be executed to and from the terminal device 201, whereby the data communication system 500 which is more sophisticated than the existing charging system 800 can be configured.

Figure 16A:
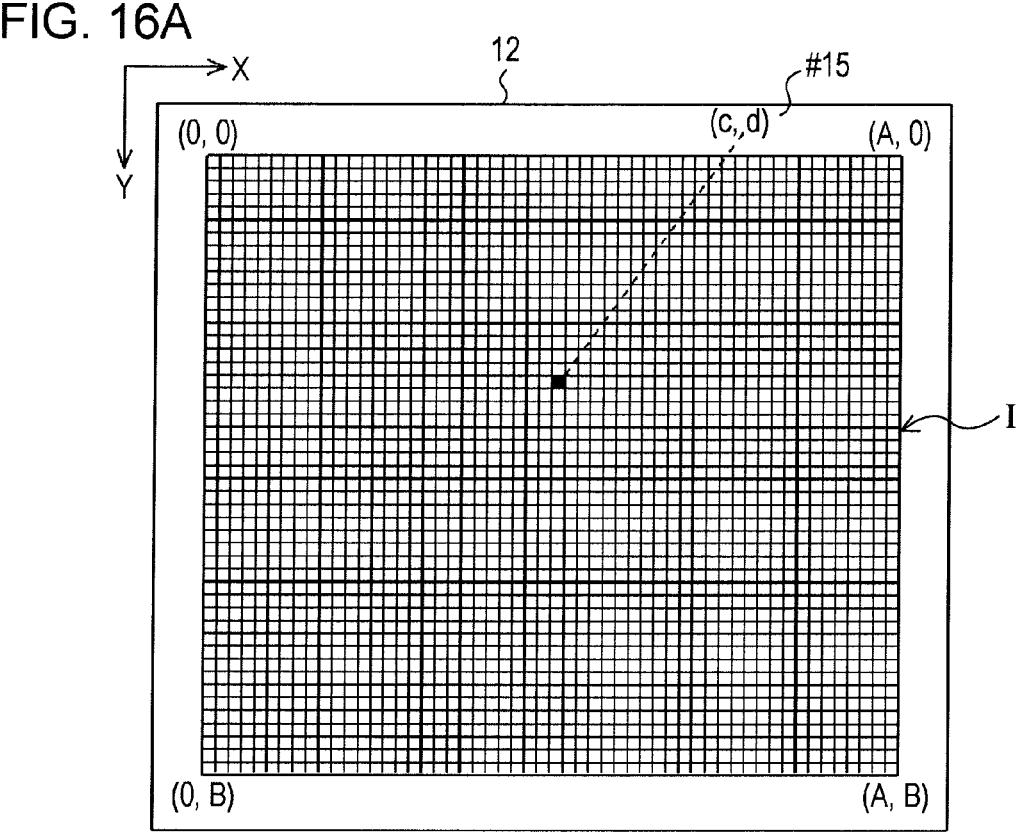
FIG. 16A is a diagram showing an exemplary display area of the display function unit 12.

Next, with reference to FIG. 16A and FIG. 16B, an exemplary display area of the display function unit 12 and an exemplary image of the terminal information D0' will be described. The display function unit 12 of the data communication device 105 shown in FIG. 16A has the display area I. The display area I has a matrix shape in which the number of pixels in a horizontal direction (in a row direction) is A and the number of pixels in a vertical direction (in a column direction) is B. If expressed in the position coordinate system XY defined on the device mounting surface of the display function unit 12, the display area I is expressed in coordinates (x, y)=(0, 0) to (C, 0) in a row direction and is expressed in coordinates (x, y)=(0, D) to coordinates (C, D) in a column direction. In this example, coordinates (x, y)=(c, d) of a feeding portion for the antenna 15 are set, the coordinate information D2' indicating the coordinates (c, d) is a specified bit indicating a data communication point for the data communication device 105.

Figure 16B:
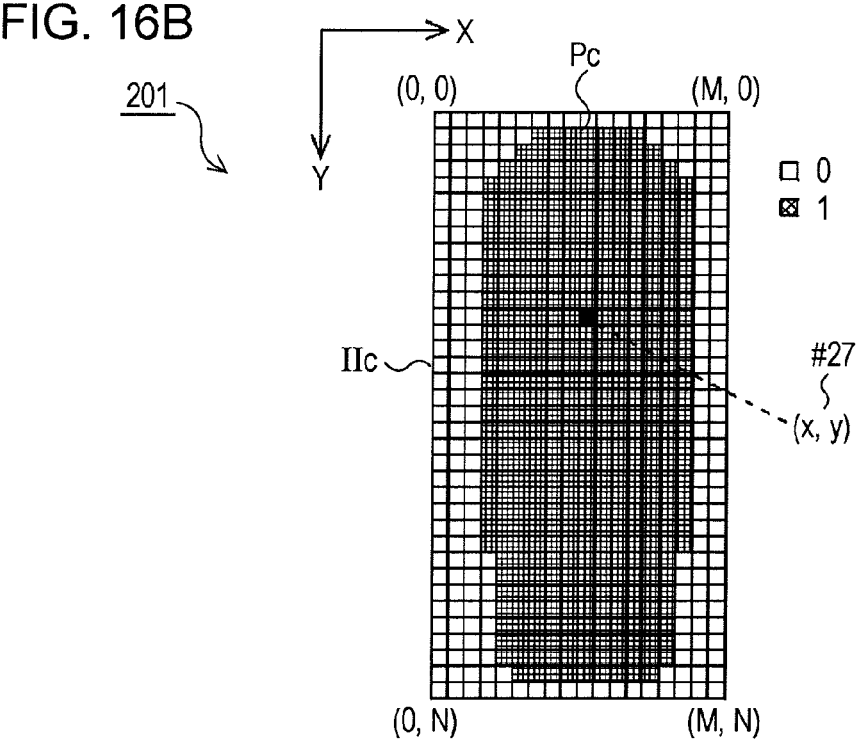
FIG. 16B is a diagram showing an exemplary image of terminal information according to the terminal device 201.

According to an exemplary image of the terminal information D0' shown in FIG. 16B, the outer-shape image Pc of the portable telephone 2c or the like is displayed on a bitmap area IIc in digital representation. The bitmap area IIc has a matrix shape (M×N bits) in which M-bit pixels are arranged in a horizontal direction (in a row direction) and N-bit pixels are arranged in a vertical direction (in a column direction). The terminal information D0' is expressed in the bitmap area IIc having M×N bits. The dimensions of bitmap are the same as the dimensions of the display device of the data communication device 105.

That is, if expressed in the position coordinate system XY defined on the device mounting surface of the display function unit 12, the bitmap area IIc is expressed in coordinates (x, y)=(0, 0) to (M, 0) in a row direction and coordinates (x, y)=(0, N) to coordinates (M, N) in a column direction. In this example, coordinates (x, y)=(m, n) of a feeding portion for the antenna 27 are set, the coordinate information D2' indicating the coordinates (m, n) is a specified bit indicating a data communication point for the portable telephone 2c.

In this example, in response to (0, 1) of each bit, the outer-shape image Pc is developed (expressed) in the bitmap area IIc. The outer-shape image Pc is an image obtained by making a displayable silhouette-like image of the exterior shape of the portable telephone 2c, for example, the projected shape of the exterior shape of the portable telephone 2a. In the outer-shape image Pc of the portable telephone 2c in this bitmap area IIc, a logical value in a solid black portion is, for example, "0". Portions that are not included in the outer shape and surround this outer-shape image Pc are expressed by white square portions whose logical value is "1". This is because the outer-shape image Pc is displayed on the bitmap area IIc in digital representation. In this way, the terminal information D0' is expressed using bitmap information such as the outer-shape information D1 and the coordinate information D2'.

Figure 17:
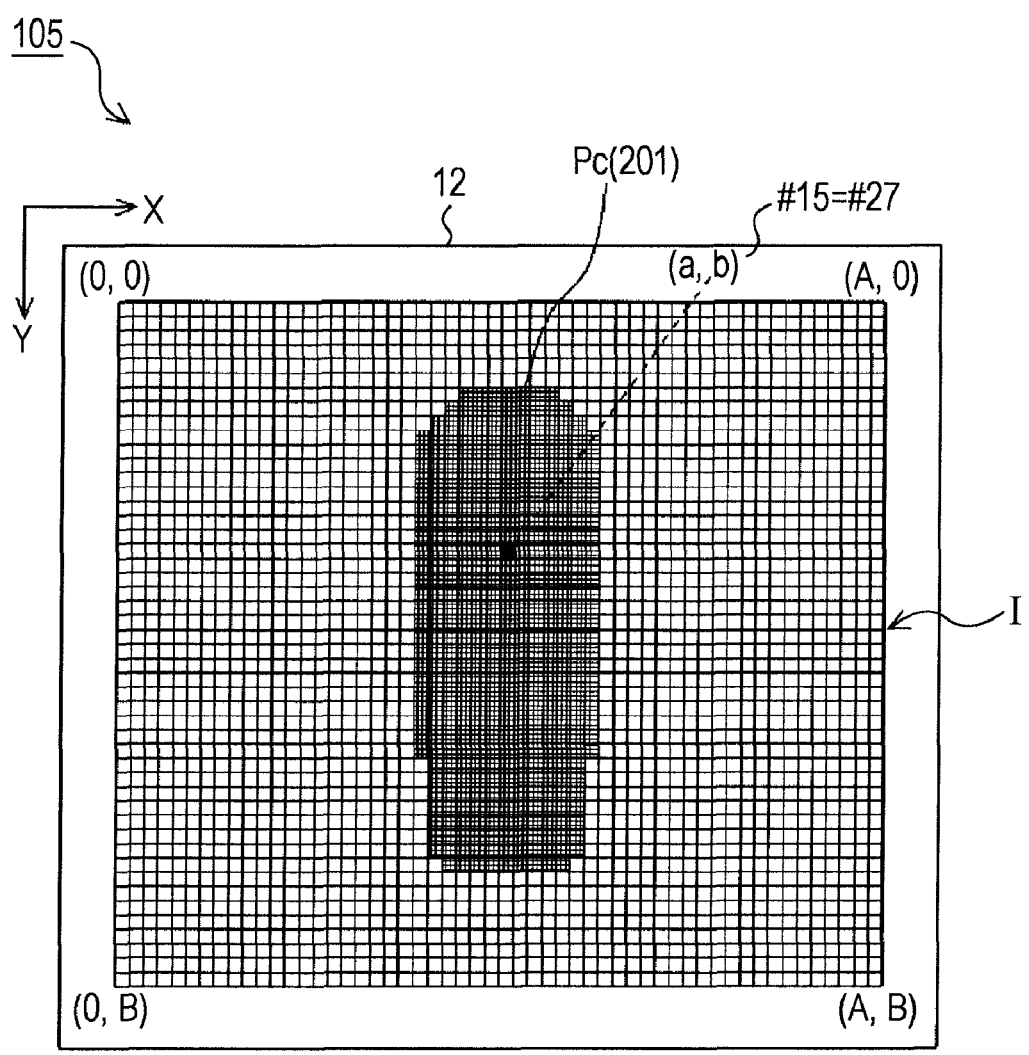
FIG. 17 is a diagram showing an example of an outer-shape image Pc displayed on the display function unit 12.

Next, with reference to FIG. 17, an example of the outer-shape image Pc displayed on the display function unit 12 will be described. According to the example of the displayed outer-shape image Pc shown in FIG. 17, in the position coordinate system XY defined on the device mounting surface of the display function unit 12, the main control unit 14 controls the display function unit 12 in such a manner that the coordinate information D2' indicating the coordinates (x, y)=(c, d) matches the coordinate information D2' indicating the coordinates (x, y)=(m, n).

In this example, the coordinates (x, y)=(0, 0) to (C, 0) in a row direction of the bitmap area IIc are allocated to the coordinates (x, y)=(0, 0) to (C, 0) in a row direction of the display area I, and the coordinates (x, y)=(0, 0) to (0, D) in a column direction of the bitmap area IIc are allocated to the coordinates (x, y)=(0, 0) to (0, D) in a column direction of the display area I, respectively. Thus, the directivity #15 (coordinates of the feeding portion) of the antenna 15, which is a specified bit of the data communication point for the data communication device 105, can match the directivity #27 (coordinates of the feeding portion) of the antenna 27, which is a specified bit of the data communication point for the portable telephone 2c.

Figure 18:
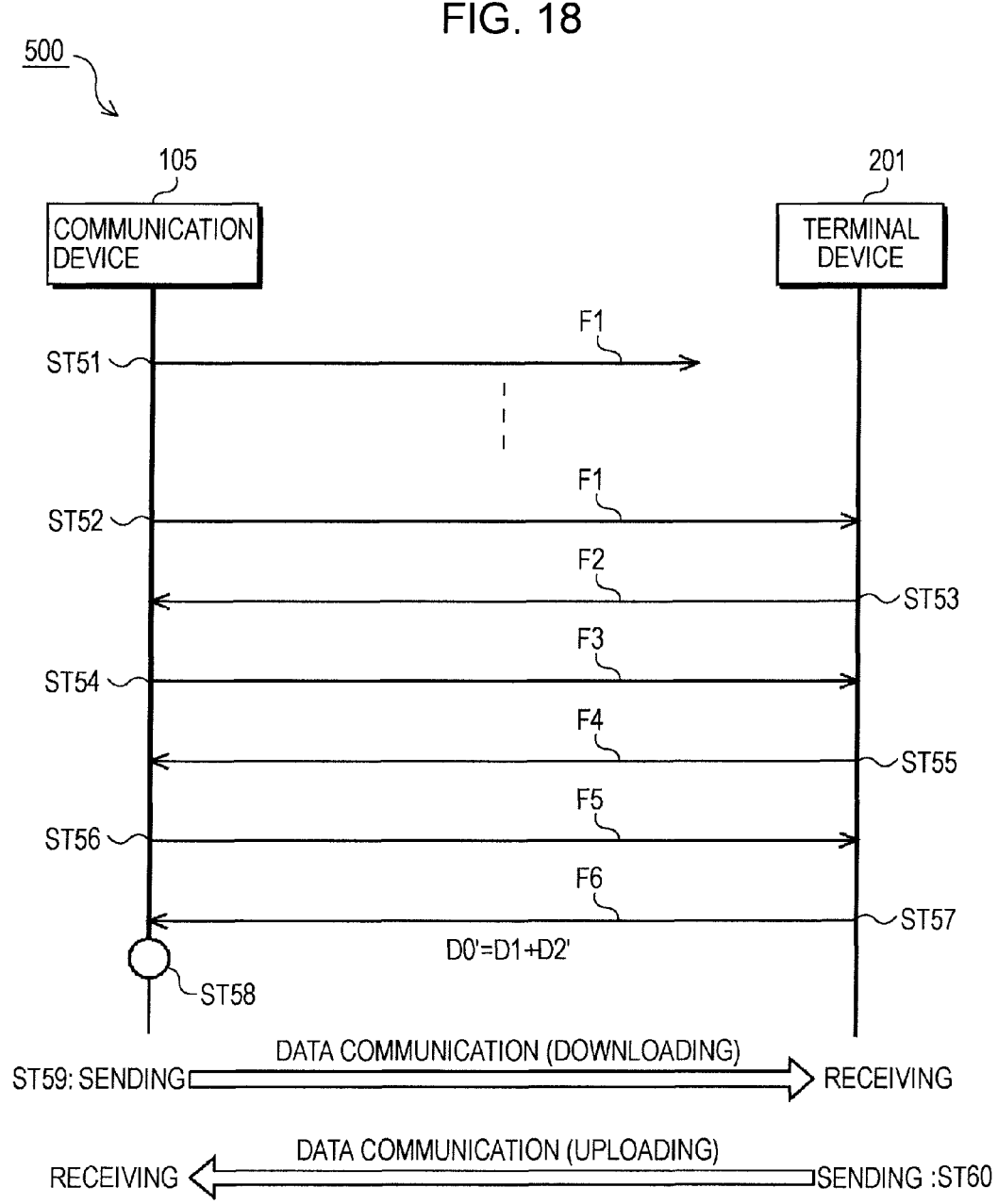
FIG. 18 is a sequence chart showing exemplary data communication processing performed in the data communication system 500.

Next, with reference to FIG. 18, regarding a wireless processing method according to the present invention, exemplary data communication processing performed in the data communication system 500 will be described. A sequence chart shown in FIG. 18 shows a frame sequence in wireless communication processing performed between the data communication device 105 and the portable telephone 2c.

In this example, a case is assumed in which wireless data communication processing is performed between the data communication device 105 that includes the antenna 15 having the predetermined directivity #15 and the display function unit 12 on the device mounting surface and performs wireless communication processing and the terminal device 201 that includes the antenna 27 having the predetermined directivity #27, has the terminal information D0' used for achieving matching between the antennas and used for achieving matching for the antenna 27 with respect to the antenna 15, and performs wireless communication processing. A case in which, when matching is to be achieved between the antennas, the portable telephone 2c sends the terminal information D0' to the data communication device 105 and the data communication device 105 receives the terminal information D0' from the portable telephone 2c and displays the outer-shape image Pc of the portable telephone 2c on the display function unit 12 in accordance with the terminal information D0' will be described as an example.

In step ST51, the data communication device 105 sends the beacon frame F1 at regular time intervals. Then, if a user brings the portable telephone 2c or the like near to the data communication device 105, in step ST52, the portable telephone 2c receives the sent beacon frame F1. In response to this beacon frame F1, in step ST53, the portable telephone 2c sends the terminal notification frame F2 to the data communication device 105.

The data communication device 105 receives the terminal notification frame F2 from the portable telephone 2c, and sends the connection request frame F3 to the portable telephone 2c in step ST54. Thereafter, the portable telephone 2c receives the connection request frame F3, and sends the connection response frame F4 to the data communication device 105 in step ST55. The data communication device 105 receives the connection response frame F4 from the portable telephone 2c, and sends the terminal-information request frame F5 to the portable telephone 2c in step ST56. Thereafter, the portable telephone 2c receives the terminal-information request frame F5, and sends the terminal-information response frame F6 to the data communication device 105 in step ST57. At this time, in the portable telephone 2c, the terminal information D0' is read from the terminal-information storing unit 26, the terminal information D0' is written into (added to) the terminal-information response frame F6, and the terminal-information response frame F6 is sent to the data communication device 105. The terminal information D0' is the outer-shape information D1+the coordinate information D2'.

Next, the data communication device 105 receives the terminal-information response frame F6 from the portable telephone 2c, and displays the outer-shape image Pc of the portable telephone 2c on the display function unit 12 in step ST58. In this example, the bitmap information regarding the portable telephone 2c shown in FIG. 16B is allocated to the display area I shown in FIG. 16A and the outer-shape image Pc of the portable telephone 2c as shown in FIG. 17 is displayed on the display function unit 12 of the data communication device 105. At this time, the data communication device 105 causes the coordinate information D2' that indicates the data communication point for the portable telephone 2c to match the coordinate information D2' that indicates the data communication point of the data communication device 105 and displays the outer-shape image Pc.

In the above-described frame sequence, everything is automatically performed, the user operation in which the portable telephone 2c is brought near to the data communication device 105 causes the data communication device 105 to halt after displaying of the outer shape of the portable telephone 2c. Then, a user who handles the portable telephone 2c mounts the portable telephone 2c so as to be aligned with the outer-shape image Pc displayed on the display function unit 12 of the data communication device 105. Thereafter, in step ST59, wireless data communication processing (downloading of data) is performed from the data communication device 105 to the portable telephone 2c, or/and, in step ST60, wireless data communication processing (uploading of data) or the like is performed is performed from the portable telephone 2c to the data communication device 105.

Figure 19:
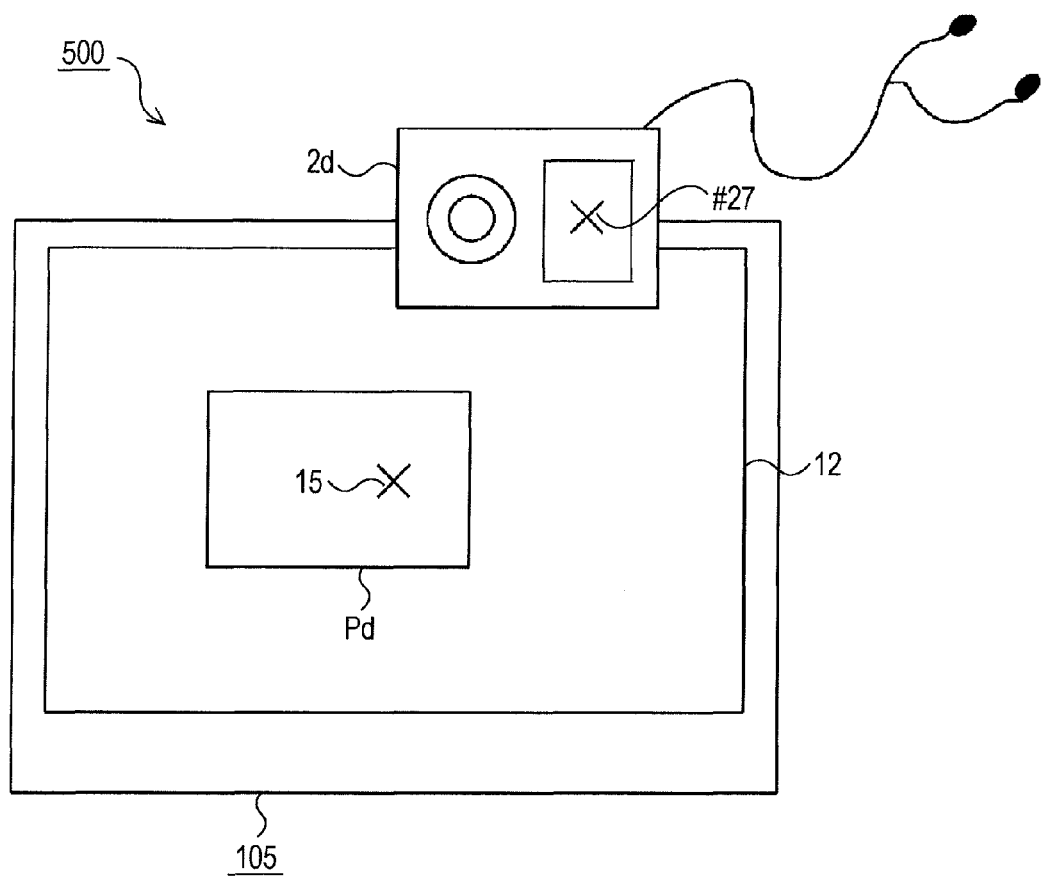
FIG. 19 is a schematic diagram showing exemplary data communication processing for a music player 2d in the data communication system 500.

Next, with reference to FIG. 19, exemplary data communication processing for the music player 2d in the data communication system 500 will be described. In the above-described data communication system 500, when the music player 2d as shown in FIG. 19 is brought near, the outer-shape image Pb of the music player 2d is displayed in such a manner that it gradually emerges on the display function unit 12.

The music player 2d functions as a second wireless electronic device, includes the antenna 27 having the predetermined directivity #27 and has the terminal information D0' used for achieving matching between the antennas and used for achieving matching for the antenna 27 with respect to the antenna 15 of the data communication device 105, and performs wireless communication processing. The antenna 27 has, for example, a circular shape, and is arranged inside a casing of the music player 2d on the back side thereof. Similarly to the portable telephone 2c, the music player 2d has, for example, a 2.45 GHz-band near-field wireless communication function, such as Bluetooth (Bluetooth).

In this case too, after a beacon frame is received, matching is achieved between the antenna 15 and the antenna 27 of the music player 2d and the data communication device 105 having a wireless communication function, and wireless processing is performed. For example, after step ST51 to step ST57 shown in FIG. 18 are performed, in step ST58, the outer-shape image Pd of the music player 2d is displayed on the display function unit 12 in a layout in which the directivity #15 of the antenna 15 of the data communication device 105 matches the directivity #27 of the antenna 27 of the music player 2d. At this time, the display function unit 12 displays the outer-shape image Pd on the device mounting surface as an arrangement position of the music player 2d so that the display function unit 12 guides the music player 2d (specified terminal device 201) to a mounting posture with which favorable data communication processing can be executed. Thus, in a case too where the data communication device 105 performs data communication with the music player 2d, high-efficiency data communication processing can be executed.

In this way, according to the data communication system 500 and a wireless processing method as the fifth embodiment, in a case where matching is to be achieved between the antenna 15 and the antenna 27 of the data communication device 105 and the terminal device 201 such as the portable telephone 2c or the music player 2d and wireless data communication is to be performed with the portable telephone 2c, the data communication device 105 receives the terminal information D0'=(D1+D2') from these portable telephones 2c and displays the outer-shape image Pc of the portable telephone 2c on the display function unit 12 in accordance with this terminal information D0', without prestoring the terminal information D0' regarding the portable telephones 2c.

Thus, matching can be achieved between the data communication device 105 and the terminal device 201 such as the portable telephone 2c or the music player 2d at an optimal wireless processing point. In the above-described example, when matching is to be achieved between the antennas, if the terminal device 201 such as the portable telephone 2c or the music player 2d is mounted so as to be aligned with the outer-shape image Pc or Pd displayed on the display function unit 12 of the data communication device 105, matching can automatically be achieved between the two antenna 15 and antenna 27 in a self-matching manner, without the antenna directivity #15 of the data communication device 105 and the antenna directivity #27 of the portable telephone 2c being aligned via visual checking of antenna appearances. Thus, in a state in which matching has been optimally achieved between the two antennas 15 and 27, desired data communication processing can be executed between the data communication device 105 and the portable telephone 2c.

Thus, according to the data communication system 500, regardless of shape of the terminal device 201 such as the portable telephone 2c or the music player 2d, in a state in which matching has been optimally achieved between the two antennas 15 and 27, desired data communication processing can be executed from the data communication device 105 to the portable telephone 2c, the music player 2d, or the like. Thus, there can be provided the data communication system 500 that can start data communication processing through a simple user operation in which the terminal device 201 such as the portable telephone 2c or the music player 2d is mounted on the device mounting surface of the data communication device 105.

[Sixth Embodiment]

Subsequent thereto, with reference to FIG. 20, an exemplary internal structure of a data communication system 600 as a sixth embodiment will be described. In this embodiment, a data communication device 106 prestores the terminal information D0' regarding the terminal device 201 such as the portable telephone 2c or the music player 2d. The data communication device 106 receives the identification information D3 (unique terminal information D0') from the portable telephone 2c at the wireless communication function unit 13, and displays the outer-shape image Pc corresponding to the portable telephone 2c in accordance with the identification information D3 received from this portable telephone 2c (fourth wireless processing system).

Figure 20:
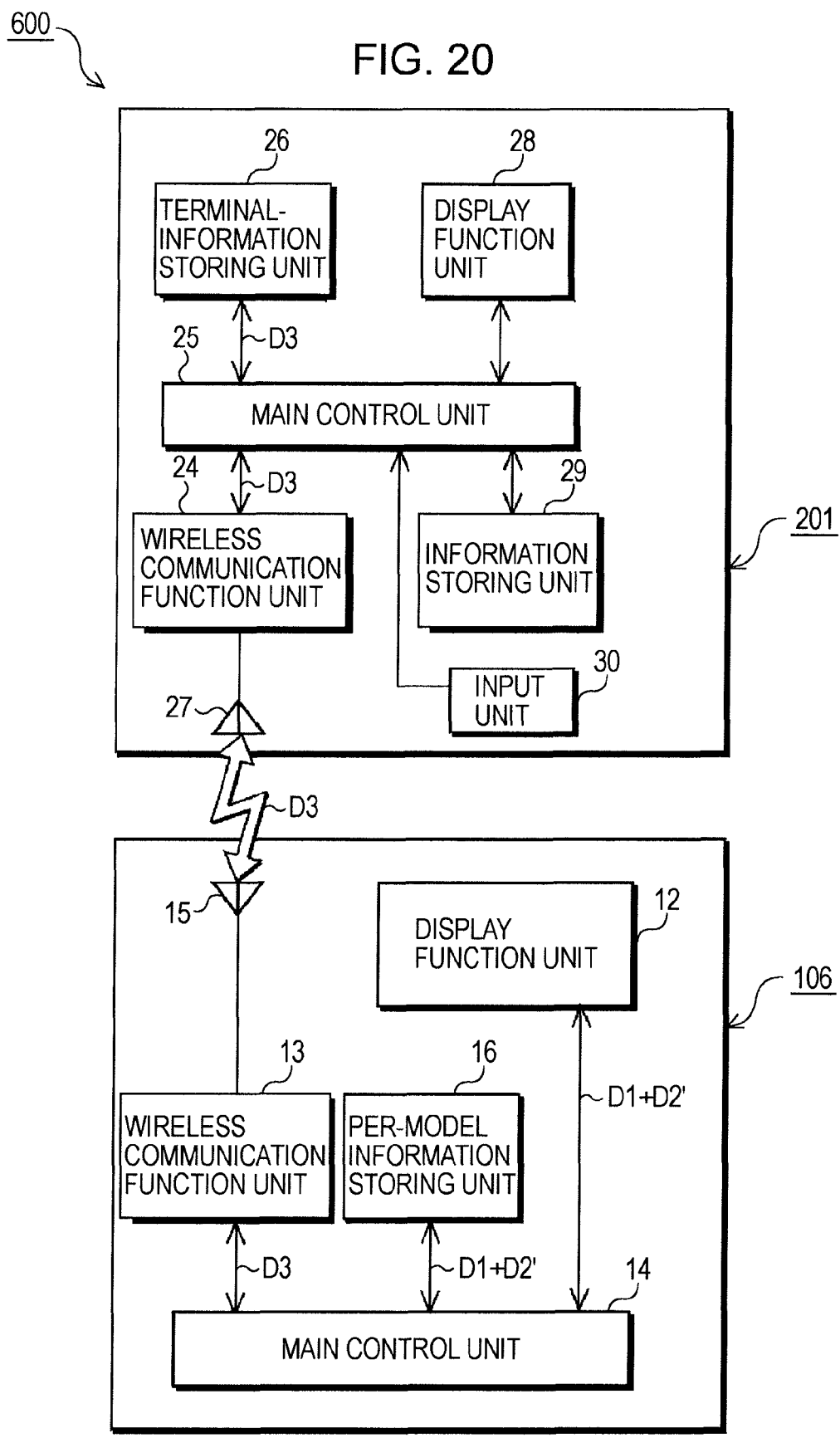
FIG. 20 is a block diagram showing an exemplary internal structure of a data communication system 600 as a sixth embodiment.

According to the data communication system 600 shown in FIG. 20, the data communication device 106 functioning as a fourth wireless electronic device includes the per-model information storing unit 16. The per-model information storing unit 16 functions as a storage unit, is connected to the main control unit 14, and stores the outer-shape information D1 and the coordinate information D2' of the terminal device 201 such as the portable telephone 2c or the music player 2d corresponding to the identification information D3. The identification information D3 is one example of the unique terminal information D0' and is information used to identify the model of the portable telephone 2c, the music player 2d, or the like.

The data communication device 106 obtains the identification information D3 from the portable telephone 2c, reads the outer-shape information D1 and the coordinate information D2' of the portable telephone 2c from the per-model information storing unit 16 in accordance with this identification information D3, and displays the outer-shape image Pc of the portable telephone 2c on the display function unit 12 on the device mounting surface. As a result of this display being performed, in the sixth embodiment too, similarly to the fifth embodiment, the data communication device 106 can automatically display the outer-shape image Pc of the portable telephone 2c through an operation in which a user brings the portable telephone 2c near to the data communication device 106. A user can perform noncontact data communication processing having high power efficiency for various terminal devices 201 such as the portable telephone 2c through a simple operation. Here, in FIG. 20, components having the same reference numerals as those in the data communication system 500 in the fifth embodiment shown in FIG. 15 have the same function, whereby description thereof will be omitted.

Next, with reference to FIG. 21, exemplary data communication processing performed in the data communication system 600 will be described. A sequence chart shown in FIG. 21 is a frame sequence in wireless communication processing performed between the data communication device 106 and the terminal device 201 such as the portable telephone 2c.

In this example, a case is assumed in which wireless data communication processing is performed between the data communication device 106 that includes the per-model information storing unit 16, the antenna 15 having the predetermined directivity #15, and the display function unit 12 on the device mounting surface and performs wireless communication processing and the terminal device 201 that includes the antenna 27 having the predetermined directivity #27, has the terminal information D0' used for achieving matching between the antennas and used for achieving matching for the antenna 27 with respect to the antenna 15, and performs wireless communication processing in accordance with the identification information D3. A case in which, when matching is to be achieved between the antennas, the portable telephone 2c sends the terminal information D0'=the identification information D3 to the data communication device 106 and the data communication device 106 receives the terminal information D0'=D3 from the portable telephone 2c and displays the outer-shape image Pc of the portable telephone 2c on the display function unit 12 in accordance with the identification information D3 will be described as an example.

Figure 21:
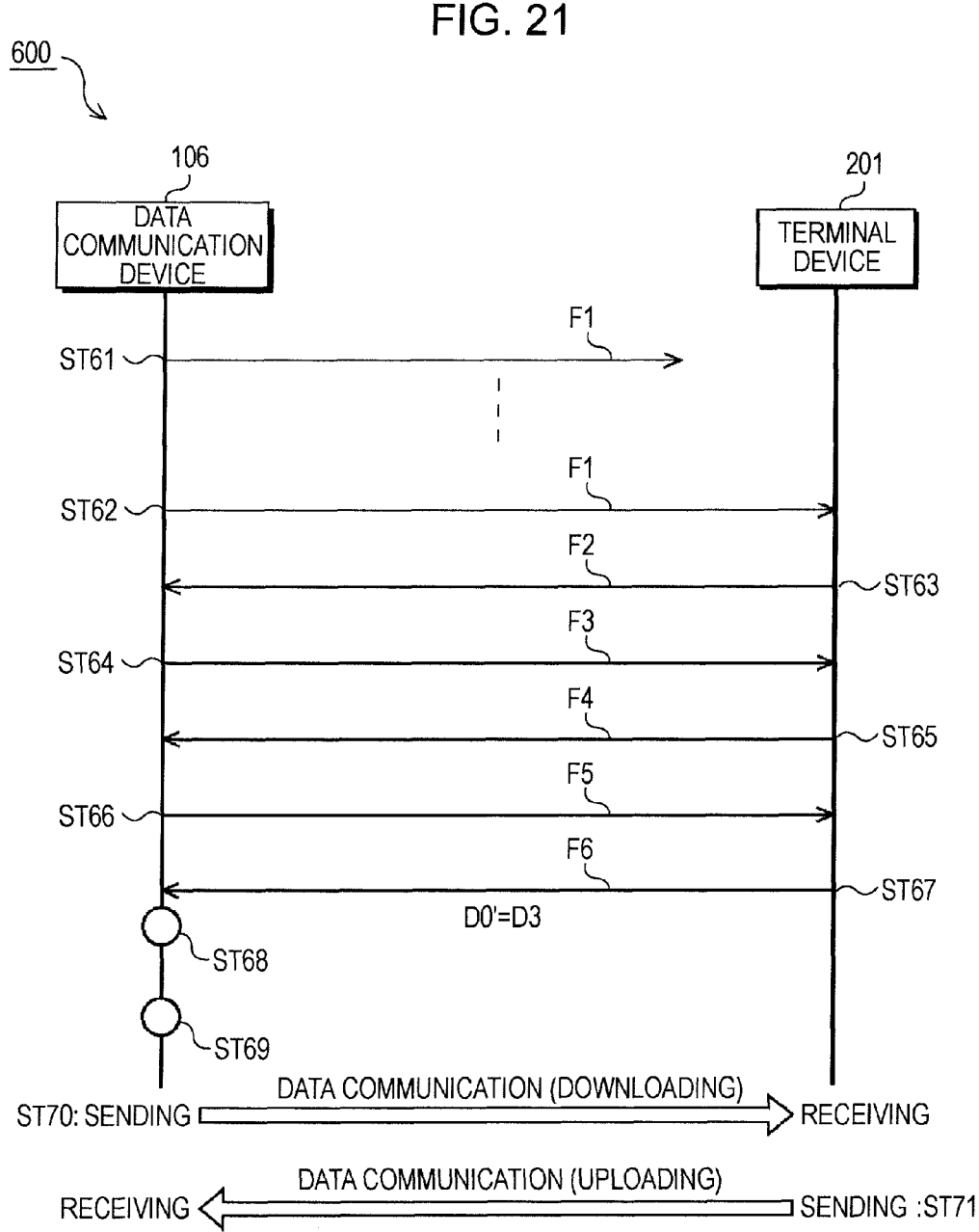
FIG. 21 is a sequence chart showing exemplary data communication processing performed in the data communication system 600.

In step ST61 shown in FIG. 21, similarly to the fifth embodiment, the data communication device 106 sends the beacon frame F1 at regular time intervals. Then, if a user brings the portable telephone 2c or the like near to the data communication device 106, in step ST62, the portable telephone 2c receives the sent beacon frame F1. In response to this beacon frame F1, in step ST63, the portable telephone 2c sends the terminal notification frame F2 to the data communication device 106.

The data communication device 106 receives the terminal notification frame F2 from the portable telephone 2c, and sends the connection request frame F3 to the portable telephone 2c in step ST64. Thereafter, the portable telephone 2c receives the connection request frame F3, and sends the connection response frame F4 to the data communication device 106 in step ST65. The data communication device 106 receives the connection response frame F4 from the portable telephone 2c, and sends the terminal-information request frame F5 to the portable telephone 2c in step ST66. Thereafter, the portable telephone 2c receives the terminal-information request frame F5, and sends the terminal-information response frame F6 to the data communication device 106 in step ST67. At this time, in the portable telephone 2c, the identification information D3 is read from the terminal-information storing unit 26, the terminal information D0'=the identification information D3 is written into (added to) the terminal-information response frame F6, and the terminal-information response frame F6 is sent to the data communication device 106.

Next, the data communication device 106 receives the terminal-information response frame F6 from the portable telephone 2c, and executes terminal-model determination processing in step ST68. According to this processing, the terminal information D0'=the identification information D3 is extracted from the terminal-information response frame F5. The main control unit 14 of the data communication device 106 uses the identification information D3 as, for example, an address, and reads corresponding outer-shape information D1 and coordinate information D2' from the per-model information storing unit 16. Thus, the model of the terminal device 201 such as the portable telephone 2c or the music player 2d is determined.

Then, in step ST69, the outer-shape image Pc of the portable telephone 2c is displayed on the display function unit 12. In this example too, similarly to the fifth embodiment, the bitmap information regarding the portable telephone 2c shown in FIG. 16B is allocated to the display area I shown in FIG. 16A, and the outer-shape image Pc of the portable telephone 2c as shown in FIG. 17 is displayed on the display function unit 12 of the data communication device 106. At this time, the data communication device 106 causes the coordinate information D2' that indicates the data communication point for the portable telephone 2c to match the coordinate information D2' that indicates the power supply point of the data communication device 106 and displays the outer-shape image Pc.

In the above-described frame sequence, similarly to the fifth embodiment, everything is automatically performed. The user operation in which the terminal device 201 such as the portable telephone 2c is brought near to the data communication device 106 causes the data communication device 106 to halt after displaying of the outer shape of the portable telephone 2c. Then, a user who handles the portable telephone 2c mounts the portable telephone 2c so as to be aligned with the outer-shape image Pc displayed on the display function unit 12 of the data communication device 106 similarly to the fifth embodiment. Thereafter, in step ST70, wireless data communication processing is performed from the data communication device 106 to the portable telephone 2c. In step ST71, wireless data communication processing is performed from the portable telephone 2c to the data communication device 106.

In this way, according to the data communication system 600 as the sixth embodiment, in a case where matching is to be achieved between the antennas 15 and 27 of the terminal device 201 such as the portable telephone 2c and the data communication device 106 and wireless data communication processing is to be performed, the identification information D3 is stored in the terminal device 201. The identification information D3 is information used to read the outer-shape information D1+the coordinate information D2' for displaying a relationship between the outer-shape image Pc or the like and the antenna directivity of the terminal device 201 in the position coordinate system used when matching is to be achieved for the antenna with respect to the antenna of the data communication device 106. In accordance with this, if the data communication device 106 receives the identification information D3 from the terminal device 201 such as the portable telephone 2c, the data communication device 106 reads the outer-shape information D1+the coordinate information D2' of the portable telephone 2c from the per-model information storing unit 16 in which a plurality of items of outer-shape information D1 and the like are stored on a per-model basis. The outer-shape image Pc of the portable telephone 2c is displayed on the display function unit 12 in accordance with this outer-shape information D1+the coordinate information D2'.

Thus, similarly to the fifth embodiment, if the terminal device 201 is mounted so as to be aligned with the outer-shape image Pc displayed on the display function unit 12 of the data communication device 106, matching can automatically be achieved between the two antennas 15 and 27 in a self-matching manner, without the antenna directivity #15 of the data communication device 106 and the antenna directivity #27 of the terminal device 201 being aligned via visual checking of their appearances. Thus, in a state in which matching has been optimally achieved between the two antennas 15 and 27, desired data communication processing can be executed from the data communication device 106 to the terminal device 201.

[Seventh Embodiment]

Figure 22:
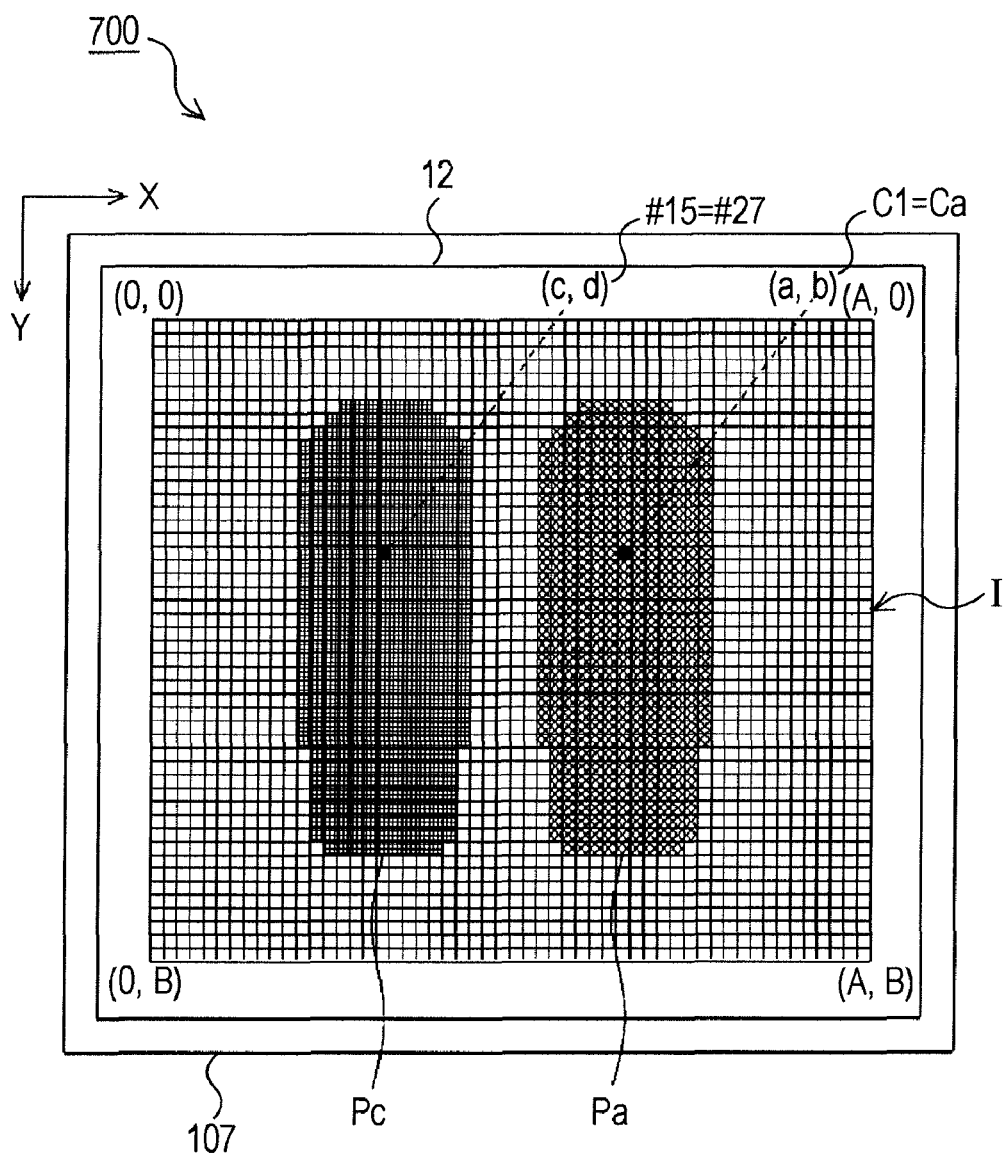
FIG. 22 is a diagram showing an example of displayed outer-shape images Pa and Pc in a data communication system 700 as a seventh embodiment.

Subsequent thereto, with reference to FIG. 22, an example of a displayed outer-shape image in a data communication system 700 as a seventh embodiment will be described. According to the example of the displayed outer-shape image in the data communication system 700 shown in FIG. 22, the outer-shape image Pa that indicates a power supply point and the outer-shape image Pc that indicates a data communication point are differentiated from each other by different colors and displayed.

In order to display the outer-shape images Pa and Pc differentiated by color in this way on the display function unit 12 of a data communication device 107 or the like, the coordinate information D2 that indicates a predetermined power supply point and the coordinate information D2' that indicates a predetermined data communication point are each stored in the terminal-information storing unit 26 of the portable telephone 2c.

In this example, in the portable telephone 2c, the coordinate information D2 that indicates a predetermined power supply point and the coordinate information D2' that indicates a predetermined data communication point are read from the terminal-information storing unit 26 through a user operation in which the portable telephone 2c is brought near to the data communication device 107, and the terminal information D0'=the outer-shape information D1+the coordinate information D2+the coordinate information D2' is sent from the portable telephone 2c to the data communication device 107.

In the data communication device 107, the main control unit 14 outputs the terminal information D0'=the outer-shape information D1+the coordinate information D2+the coordinate information D2' to the display function unit 12. The display function unit 12 individually displays the outer-shape images Pa and Pc that can perform both favorable charging and favorable noncontact data communication, on the device mounting surface in accordance with this the terminal information D0'=the outer-shape information D1+the coordinate information D2+the coordinate information D2'. Thus, a user can select either the outer-shape image Pa that indicates a power supply point or the outer-shape image Pc that indicates a data communication point, the outer-shape images Pa and Pc being displayed on the display function unit 12 on the device mounting surface.

In this way, according to the example of the displayed outer-shape images Pa and Pc in the data communication system 700 as the seventh embodiment, displaying of the outer-shape image Pa that indicates a power supply point and displaying of the outer-shape image Pc that indicates a data communication point are individually performed on the device mounting surface of the data communication device 107. These are displayed, for example, in different colors.

Thus, a user may select either a noncontact charging process or noncontact data communication processing, and place the terminal device 2 or the terminal device 201. Thus, a surface area on which a wireless electronic device is not placed can be utilized for noncontact data communication processing or a noncontact charging process for another portable telephone 2c or the like.

Industrial Applicability

This invention is significantly preferable when applied to a noncontact power supply system that performs charging at a desired power, a noncontact data communication system and a portable terminal device that perform communication processing using image and audio information, and the like.

The invention claimed is:

1. A wireless processing system that achieves matching between antennas of two wireless electronic devices and performs wireless processing, characterized by comprising:
   a first wireless electronic device that includes an antenna having a predetermined directivity and a display unit on a device mounting surface and performs wireless communication processing; and
   a second wireless electronic device that includes an antenna having a predetermined directivity, has terminal information used for achieving matching between antennas and used for achieving matching for the antenna with respect to the antenna of the first wireless electronic device, and performs wireless communication processing,
   wherein the first wireless electronic device
   receives the terminal information from the second wireless electronic device, and
   displays an outer-shape image of the second wireless electronic device on the display unit in accordance with the terminal information.

2. The wireless processing system according to claim 1, characterized in that: the terminal information
   is stored in the second wireless electronic device, and
   is outer-shape information for displaying a relationship between an outer-shape image and an antenna directivity of the second wireless electronic device in a position coordinate system used when matching is to be achieved for the antenna with respect to the antenna of the first wireless electronic device.

3. The wireless processing system according to claim 1, characterized in that: the terminal information
   is stored in the second wireless electronic device, and
   is identification information used to read outer-shape information for displaying a relationship between an outer-shape image and an antenna directivity of the second wireless electronic device in a position coordinate system used when matching is to be achieved for the antenna with respect to the antenna of the first wireless electronic device, and
   the first wireless electronic device
   includes a storage unit that stores, on a per-model basis, a plurality of items of outer-shape information that are read using the identification information received from the second wireless electronic device.

4. The wireless processing system according to claim 1, characterized in that: the second wireless electronic device is mounted so as to be aligned with the outer-shape image displayed on the display unit of the first wireless electronic device.

5. The wireless processing system according to claim 1, characterized in that: the first wireless electronic device has a power supply function, and
   displays the outer-shape image of the second wireless electronic device on the display unit on the device mounting surface in accordance with the terminal information, and supplies power to the second wireless electronic device in a noncontact manner if the second wireless electronic device is mounted on the device mounting surface.

6. The wireless processing system according to claim 5, characterized in that: the terminal information
   includes outer-shape information regarding the second wireless electronic device and coordinate information that informs the first wireless electronic device of an optimal power supply point, and
   the first wireless electronic device obtains the outer-shape information and the coordinate information from the second wireless electronic device and displays the outer-shape image of the second wireless electronic device on the device mounting surface.

7. The wireless processing system according to claim 5, characterized in that: the terminal information
is identification information used to identify a model of the second wireless electronic device,
the first wireless electronic device
includes a storage unit that stores outer-shape information and coordinate information regarding the second wireless electronic device corresponding to the identification information, and
the first wireless electronic device
obtains the identification information from the second wireless electronic device, and
reads the outer-shape information and the coordinate information regarding the second wireless electronic device from the storage unit in accordance with the identification information, and displays the outer-shape image of the second wireless electronic device on the display unit on the device mounting surface.

8. The wireless processing system according to claim 1, characterized in that: each of the first wireless electronic device and the second wireless electronic device has a function of performing data communication, and
the first wireless electronic device
displays the outer-shape image of the second wireless electronic device on the display unit on the device mounting surface in accordance with the terminal information, and executes data communication to the second wireless electronic device in a noncontact manner if the second wireless electronic device is mounted on the device mounting surface.

9. The wireless processing system according to claim 8, characterized in that: the terminal information
includes outer-shape information regarding the second wireless electronic device and coordinate information that informs the first wireless electronic device of a predetermined data communication point, and
the first wireless electronic device
obtains the outer-shape information and the coordinate information from the second wireless electronic device and displays the outer-shape image of the second wireless electronic device on the device mounting surface.

10. The wireless processing system according to claim 8, characterized in that: the terminal information
is identification information used to identify a model of the second wireless electronic device,
the first wireless electronic device
includes a storage unit that stores outer-shape information and coordinate information regarding the second wireless electronic device corresponding to the identification information, and
the first wireless electronic device
obtains the identification information from the second wireless electronic device,
reads the outer-shape information and the coordinate information regarding the second wireless electronic device from the storage unit in accordance with the identification information and displays the outer-shape image of the second wireless electronic device on the display unit on the device mounting surface.

11. The wireless processing system according to claim 9, characterized in that: the second wireless electronic device stores coordinate information that indicates a predetermined power supply point and coordinate information that indicates a predetermined data communication point as the same value, and
displays an outer-shape image that indicates the power supply point and an outer-shape image that indicates the data communication point as one image on the display unit on the device mounting surface of the first wireless electronic device.

12. The wireless processing system according to claim 9, characterized in that: the second wireless electronic device stores each of coordinate information that indicates a predetermined power supply point and coordinate information that indicates a predetermined data communication point, and
displays an outer-shape image that indicates the power supply point and an outer-shape image that indicates the data communication point individually on the display unit on the device mounting surface of the first wireless electronic device.

13. The wireless processing system according to claim 12, characterized in that: the outer-shape image that indicates the power supply point and the outer-shape image that indicates the data communication point are differentiated from each other by different colors and displayed.

14. A wireless processing method for achieving matching between two antennas of a first wireless electronic device and a second wireless electronic device and performing wireless processing, the first wireless electronic device including an antenna having a predetermined directivity and a display unit on a device mounting surface and performing wireless communication processing and the second wireless electronic device including an antenna having a predetermined directivity, having terminal information used for achieving matching between antennas and used for achieving matching for the antenna with respect to the antenna of the first wireless electronic device, and performing wireless communication processing, characterized in that:
when matching is to be achieved between the antennas,
the second wireless electronic device
sends the terminal information to the first wireless electronic device, and
the first wireless electronic device
receives the terminal information from the second wireless electronic device and
displays an outer-shape image of the second wireless electronic device on the display unit in accordance with the terminal information.

15. A wireless electronic device that is applicable to a system that achieves matching between antennas of two wireless electronic devices and performs wireless processing, characterized by comprising:
an antenna having a predetermined directivity;
a display unit provided on a device mounting surface and used when matching is to be achieved for the antenna; and
a wireless processing unit that performs wireless communication processing to and from another wireless electronic device mounted on the display unit,
wherein if information for displaying a relationship between an outer-shape image and an antenna directivity of the other wireless electronic device in a position coordinate system used when matching is to be achieved for the antenna of the wireless electronic device is treated as outer-shape information,
the wireless processing unit
receives the outer-shape information from the other wireless electronic device, and displays the outer-shape image of the other wireless electronic device based on the outer-shape information on the display unit.

16. A wireless electronic device that is applicable to a system that achieves matching between antennas of two wireless electronic devices including a wireless electronic device provided with a display unit on a device mounting surface and performs wireless processing, characterized by comprising:
an antenna having a predetermined directivity;
a storage unit that stores outer-shape information for displaying a relationship between an outer-shape image and the directivity of the antenna of the wireless electronic device in a position coordinate system used when matching is to be achieved for the antenna with respect to an antenna of the wireless electronic device provided with the display unit; and
a wireless processing unit that performs wireless communication processing in accordance with the outer-shape information read from the storage unit,
wherein the wireless processing unit,
when matching is to be achieved between the antennas,
sends the outer-shape information to the wireless electronic device provided with the display unit.

17. A wireless electronic device that is applicable to a system that achieves matching between antennas of two wireless electronic devices and performs wireless processing, characterized by comprising:
an antenna having a predetermined directivity;
a display unit provided on a device mounting surface and used when matching is to be achieved for the antenna;
a wireless processing unit that performs wireless communication processing to and from another wireless electronic device mounted on the display unit; and
a storage unit that stores, if information for displaying a relationship between an outer-shape image and the directivity of the antenna of the wireless electronic device in a position coordinate system used when matching is to be achieved for the antenna with respect to an antenna of the other wireless electronic device is treated as outer-shape information and information used to read the outer-shape information is treated as identification information, the outer-shape information,
the wireless processing unit
receives the identification information from the other wireless electronic device,
reads outer-shape information regarding the other wireless electronic device based on the identification information from the storage unit, and
displays an outer-shape image of the other wireless electronic device on the display unit in accordance with the outer-shape information.

18. A wireless electronic device that is applicable to a system that achieves matching between antennas of two wireless electronic devices including a wireless electronic device provided with a display unit on a device mounting surface and performs wireless processing, characterized by comprising:
an antenna having a predetermined directivity;
a storage unit that stores identification information used to read outer-shape information for displaying a relationship between an outer-shape image and the directivity of the antenna of the wireless electronic device in a position coordinate system used when matching is to be achieved for the antenna with respect to an antenna of the wireless electronic device provided with the display unit; and
a wireless processing unit that performs wireless communication processing in accordance with the identification information read from the storage unit,
wherein the wireless processing unit,
when matching is to be achieved between the antennas,
sends the identification information to the wireless electronic device provided with the display unit.

* * * * *